(12) United States Patent
Ohki

(10) Patent No.: US 11,454,723 B2
(45) Date of Patent: Sep. 27, 2022

(54) DISTANCE MEASURING DEVICE AND DISTANCE MEASURING DEVICE CONTROL METHOD

(71) Applicant: SONY SEMICONDUCTOR SOLUTIONS CORPORATION, Kanagawa (JP)

(72) Inventor: Mitsuharu Ohki, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 771 days.

(21) Appl. No.: 16/334,538

(22) PCT Filed: Sep. 5, 2017

(86) PCT No.: PCT/JP2017/031939
§ 371 (c)(1),
(2) Date: Mar. 19, 2019

(87) PCT Pub. No.: WO2018/074085
PCT Pub. Date: Apr. 26, 2018

(65) Prior Publication Data
US 2021/0286082 A1    Sep. 16, 2021

(30) Foreign Application Priority Data

Oct. 21, 2016  (JP) .............................. JP2016-206912

(51) Int. Cl.
*G01S 17/89* (2020.01)
*G01S 17/10* (2020.01)
(Continued)

(52) U.S. Cl.
CPC ............ *G01S 17/894* (2020.01); *G01S 17/10* (2013.01); *G01S 17/87* (2013.01); *G01S 17/89* (2013.01);
(Continued)

(58) Field of Classification Search
CPC ........ G01S 17/894; G01S 17/86; G01S 17/87; G01S 17/10; G01S 17/89; H04N 5/225;
(Continued)

(56) References Cited

U.S. PATENT DOCUMENTS 11,254,439 B2 * 2/2022 Emerson ................ B64D 37/32
11,255,663 B2 * 2/2022 Binder .................... G01S 17/08
(Continued)

FOREIGN PATENT DOCUMENTS

CA    2846653 A1    6/2014
CN    104903677 A   9/2015
(Continued)

OTHER PUBLICATIONS

Chan, et al., "A Noise-Aware Filter for Real-Time Depth Upsampling", M2SFA2 2008: Workshop on Multi-camera and Multi-modal Sensor Fusion, 2008, pp. 1-12.
(Continued)

*Primary Examiner* — Wesner Sajous
(74) *Attorney, Agent, or Firm* — Chip Law Group

(57) ABSTRACT

Upsampling is performed accurately in a device that measures a distance on the basis of a phase difference of light. A predetermined number of pixel blocks in which a plurality of continuous light pixels that generate continuous light reception data indicating amounts of received continuous light is arranged in a continuous light reception unit. An intermittent light pixel that generates intermittent light reception data indicating an amount of received intermittent light is provided in correlation with each of the predetermined number of pixel blocks in an intermittent light reception unit. A distance measuring unit generates distance data for each of the plurality of continuous light pixels using an average value of the continuous light reception data for each of the pixel blocks, the continuous light reception data, (Continued)

and the intermittent light reception data as high-resolution distance data.

9 Claims, 31 Drawing Sheets

(51) Int. Cl.

| | | |
|---|---|---|
| *G01S 17/87* | (2020.01) | |
| *G06T 5/20* | (2006.01) | |
| *G06T 5/50* | (2006.01) | |
| *G06T 3/40* | (2006.01) | |
| *H04N 5/33* | (2006.01) | |
| *G01S 17/894* | (2020.01) | |
| *H04N 5/335* | (2011.01) | |

(52) U.S. Cl.
CPC .............. *G06T 3/4053* (2013.01); *G06T 5/20* (2013.01); *G06T 5/50* (2013.01); *G06T 2207/10028* (2013.01); *G06T 2207/20028* (2013.01); *H04N 5/335* (2013.01)

(58) Field of Classification Search
CPC .......... H04N 5/335; G06T 2207/20028; G06T 2207/10028
See application file for complete search history.

(56) References Cited

U.S. PATENT DOCUMENTS

| | | | |
|---|---|---|---|
| 2008/0267494 A1 | 10/2008 | Cohen et al. | |
| 2012/0169848 A1 | 7/2012 | Bae et al. | |
| 2014/0219547 A1 | 8/2014 | Tuzel et al. | |
| 2015/0193910 A1 | 7/2015 | Tuzel et al. | |
| 2016/0005179 A1 | 1/2016 | Petyushko et al. | |
| 2018/0292206 A1* | 10/2018 | Ohki | G01S 17/93 |
| 2019/0154439 A1* | 5/2019 | Binder | G01B 15/00 |
| 2020/0191565 A1* | 6/2020 | Ohki | G06T 7/55 |

FOREIGN PATENT DOCUMENTS

| | | | | |
|---|---|---|---|---|
| EP | 2466901 A2 | | 6/2012 | |
| JP | 2014-150521 A | | 8/2014 | |
| JP | 2015-175752 A | | 10/2015 | |
| JP | 2016-510396 A | | 4/2016 | |
| JP | 2018036102 | * | 8/2016 | ........... G01S 17/894 |
| JP | 2017-150893 A | | 8/2017 | |
| KR | 10-2012-0075739 A | | 7/2012 | |
| KR | 10-2015-0096416 A | | 8/2015 | |
| WO | 2014/099048 A2 | | 6/2014 | |
| WO | 2017/145450 A1 | | 8/2017 | |

OTHER PUBLICATIONS

Yang, et al., "Spatial-Depth Super Resolution for Range Images", 2007 IEEE Conference on Computer Vision and Pattern Recognition, Jun. 22, 2007, 08 pages.

Frestl, et al., "Image Guided Depth Upsampling using Anisotropic Total Generalized Variation", 2013 IEEE International Conference on Computer Vision, Dec. 8, 2013, pp. 993-1000.

"Realization of High Quality of Distance Image Based on Guided Filter That Uses IR Reflection Intensity Image", The 21 Symposium on Sensing via Image Information, Jun. 12, 2015, pp. IS1-19-1 to IS1-19-6.

"First Paragraph: Development of Three-Dimensional Range Sensor of High Resolution via Fusing between Color Information and Range Data", NTS, Fifth Section: Development of Sensor for Three-Dimensional Sensing, May 29, 2015, pp. 187-194.

Chan, et al., "A Noise-Aware Filter for Real-Time Depth Upsampling", 2008: Workshop on Multi-camera and Multi-modal Sensor Fusion, 12 pages.

Yang, et al., "Spatial-Depth Super Resolution for Range Images", 2007 IEEE, 08 pages.

Ferstl, et al., "Image Guided Depth Upsampling using Anisotropic Total Generalized Variation", 2013 IEEE International Conference on Computer Vision, 993-1000 pages.

"Realization of High Quality of Distance Image Based on Guided Filter That Uses IR Reflection Intensity Image", The 21th Symposium on Sensing via Image information, Jun. 12, 2015, 09 pages.

"Development of Three-Dimensional Range Sensor of High Resolution via Fusing between Color Information and Range Data", NTS Inc, May 29, 2015, 187-194 pages.

International Search Report and Written Opinion of PCT Application No. PCT/JP2017/031939, dated Nov. 28, 2017, 10 pages of ISRWO.

Ferstl, et al., "Image Guided Depth Upsampling using Anisotropic Total Generalized Variation", 2013 IEEE International Conference on Computer Vision, pp. 993-1000.

"Realization of High Quality of Distance Image Based on Guided Filter That Uses IR Reflection Intensity Image", The 21th Symposium on Sensing via Image Information, SSII2015, Jun. 12, 2015, 09 pages.

"Development of Three-Dimensional Range Sensor of High Resolution via Fusing between Color Information and Range Data", NTS Inc., May 29, 2015, pp. 187-194.

* cited by examiner

DISTANCE MEASURING DEVICE AND DISTANCE MEASURING DEVICE CONTROL METHOD

CROSS REFERENCE TO RELATED APPLICATIONS

This application is a U.S. National Phase of International Patent Application No. PCT/JP2017/031939 filed on Sep. 5, 2017, which claims priority benefit of Japanese Patent Application No. JP 2016-206912 filed in the Japan Patent Office on Oct. 21, 2016. Each of the above-referenced applications is hereby incorporated herein by reference in its entirety.

TECHNICAL FIELD

The present technology relates to a distance measuring device and a distance measuring device control method. Specifically, the present technology relates to a distance measuring device that measures a distance on the basis of a phase difference of light and a method for controlling the distance measuring device.

BACKGROUND ART

A scheme called 031390 time of flight (ToF) is known as one of range sensors. In ToF, a device emits radiation light of sinusoidal waves or rectangular waves from an emitter and receives reflected light having reached a target object and having been reflected therefrom with sensors and thereby measures distance.

Sensors (ToF sensors) that receive light include pixels arranged in a 2-dimensional array form. These respective pixels have light reception elements and can take in light. More specifically, the respective pixels are exposed to a total quantity of reflected light (amount of light) reaching the pixel from a predetermined angle of R degrees to R+180 degrees with respect to the phase of radiation light. Generally, the ToF sensors receive light at the angles R of 0, 180, 90, and 270 degrees. The amounts of light received at the respective angles R (accurately speaking, charge amounts which are photoelectrically converted from the amounts of received light) are defined as Q1, Q2, Q3, and Q4. Distance D can be obtained from these four measured charge signals (Q1 to Q4) by predetermined computation.

Since the ToF sensor has a complex structure, the pixel size is large. Therefore, the number of pixels of general solid-state imaging elements is several megapixels, whereas the number of pixels of ToF sensors is approximately the VGA size, for example.

Moreover, ToF sensors are often used in parallel with general solid-state imaging elements. Therefore, a method of upsampling low-resolution distance data obtained from ToF sensors to convert the same to high-resolution distance data using image data of general solid-state imaging elements as a hint has been proposed (for example, see Non-Patent Document 1).

This upsampling will be described using FIGS. 12A, 12B, 12C, 12D, and 10. Although ToF sensors and general solid-state imaging elements perform 2-dimensional distance measurement and imaging, pixel positions are depicted one-dimensionally in FIGS. 12A, 12B, 12C, and 12D for the sake of convenience of description. Herein, solid-state imaging elements that image monochrome image data are used as general image sensors. That is, as illustrated in FIG. 10, a ToF sensor 200 and a solid-state imaging element 130 are provided in parallel and perform distance measurement and imaging of an object surface.

Since the ToF sensor 200 has a small number of pixels, a distance measuring direction is solid lines (511 and the like) in FIG. 10. On the other hand, since the monochrome image sensor 200 has a large number of pixels, an imaging direction is dot lines (501 to 505 and the like) larger in number than the solid lines. Here, for simplicity of the drawing, the number of pixels of the ToF sensor 200 is four and the number of pixels of the monochrome image sensor 200 is 21. The respective dot and solid lines correspond to pixels.

In conventional upsampling, distance data made up of four pixels that perform distance measurement on the solid-line directions is upsampled to create distance data of twenty-one pixels using image data made up of twenty-one pixels that perform imaging on the dot-line directions as a hint.

As understood from FIG. 10, the solid line 511 and the dot lines 501 to 505 perform distance measurement and imaging on the same position of an object surface. Therefore, as illustrated in FIG. 12D, distance data is upsampled using the relation between distance data measured by the pixel in the direction of the solid line 511 and luminance data obtained by the pixels in the directions of the corresponding dot lines 501 to 505. As a result, it is possible to obtain twenty-one pieces of distance data illustrated in FIG. 12C. Conventional upsampling is performed using such a correlation (the correlation in FIG. 12D).

CITATION LIST

Non-Patent Document

Non-Patent Document 1: D. Chan et al., A Noise-Aware Filter for Real-Time Depth Upsampling, ECCV Workshops 2008.

SUMMARY OF THE INVENTION

Problems to be Solved by the Invention

As illustrated in FIG. 12D, in the conventional technology, upsampling is performed on assumption that one pixel of the ToF sensor 200 measures the distance to a position on an object related to one pixel of the corresponding solid-state imaging element in a pinpoint manner. However, an actual pixel of the ToF sensor 200 has a certain size. Therefore, the positions of the object surface measured by the respective pixels are not pin-points, and an average distance of a region having a certain area is measured. Therefore, in the conventional technology, there is a problem that it is not possible to perform accurate upsampling.

The present technology has been made in view of such a circumstance, and an object thereof is to perform upsampling accurately in a device that measures a distance on the basis of a phase difference of light.

Solutions to Problems

The present technology has been made to solve the above-described problems, and a first aspect of the present technology is a distance measuring device and a method for controlling the same, the distance measuring device including: a continuous light reception unit having a predetermined number of pixel blocks in which a plurality of continuous light pixels that generate continuous light reception data indicating amounts of received continuous light is arranged; an intermittent light reception unit in which an intermittent light pixel that generates intermittent light reception data indicating an amount of received intermittent light is provided in correlation with each of the predetermined number of pixel blocks; and a distance measuring unit that generates distance data for each of the plurality of continuous light pixels using an average value of the continuous light reception data for each of the pixel blocks, the continuous light reception data, and the intermittent light reception data as high-resolution distance data. In this way, an effect that high-resolution distance data is generated on the basis of the average value of the continuous light reception data of the respective pixel blocks, the continuous light reception data, and the intermittent light reception data is obtained.

Moreover, in the first aspect, the distance measuring unit may include: a predetermined filter; and an average calculation unit that calculates the average value for each of the pixel blocks and inputs the average value to the predetermined filter. In this way, an effect that the high-resolution distance data is generated by the predetermined filter is obtained.

Moreover, in the first aspect, the predetermined filter may be a cross bilateral filter. In this way, an effect that the high-resolution distance data is generated by the cross bilateral filter is obtained.

Moreover, in the first aspect, the distance measuring unit may further include: a low-resolution distance data generation unit that generates distance data for each of the intermittent light pixels on the basis of the intermittent light reception data as low-resolution distance data and inputs the low-resolution distance data to the predetermined filter, and the predetermined filter may generate the high-resolution distance data on the basis of the low-resolution distance data, the average value, and the continuous light reception data. In this way, an effect that the high-resolution distance data is generated on the basis of the low-resolution distance data, the average value, and the continuous light reception data is obtained.

Moreover, in the first aspect, the intermittent light reception data may include first, second, third, and fourth low-resolution charge signals, and the distance measuring unit may further include: a difference data generation unit that generates difference data between the first and second low-resolution charge signals and difference data between the third and fourth low-resolution charge signals for each of the intermittent light pixels as low-resolution difference data and inputs the low-resolution difference data to the predetermined filter; and a high-resolution difference data conversion unit that converts high-resolution difference data to the high-resolution distance data for each of the continuous light pixels, and the predetermined filter may generate the high-resolution difference data on the basis of the low-resolution difference data, the average value, and the continuous light reception data. In this way, an effect that the high-resolution difference data is generated on the basis of the low-resolution difference data, the average value, and the continuous light reception data is obtained.

Moreover, in the first aspect, the distance measuring unit may include: an average calculation unit that calculates the average value for each of the pixel blocks; and a regression analysis unit that calculates a predetermined function from the average value by regression analysis. In this way, an effect that the predetermined function is calculated by the regression analysis is obtained.

Moreover, in the first aspect, the distance measuring unit may further include: a low-resolution distance data generation unit that generates distance data for each of the intermittent light pixels on the basis of the intermittent light reception data as low-resolution distance data and inputs the low-resolution distance data to the regression analysis unit; and a high-resolution distance data generation unit that inputs the continuous light reception data to the predetermined function to generate the high-resolution distance data, and the regression analysis unit may calculate a function indicating a relation between the low-resolution distance data and the average value as the predetermined function. In this way, an effect that the function indicating the relation between the low-resolution distance data and the average value is calculated is obtained.

Moreover, in the first aspect, the intermittent light reception data may include first, second, third, and fourth low-resolution charge signals, the distance measuring unit may further include: a difference data generation unit that generates difference data between the first and second low-resolution charge signals and difference data between the third and fourth low-resolution charge signals for each of the intermittent light pixels as low-resolution difference data and inputs the low-resolution difference data to the regression analysis unit; a high-resolution distance data generation unit that inputs the continuous light reception data to the predetermined function to generate high-resolution difference data for each of the continuous light pixels; and a high-resolution difference data conversion unit that converts the high-resolution difference data to the high-resolution distance data for each of the continuous light pixels, and the regression analysis unit may calculate a function indicating a relation between the low-resolution difference data and the average value as the predetermined function. In this way, an effect that the function indicating the relation between the low-resolution difference data and the average value is calculated is obtained.

Moreover, a second aspect of the present technology is a distance measuring device and a method for controlling the same, the distance measuring device including: a continuous light reception unit having a predetermined number of pixel blocks in which a plurality of continuous light pixels that generate continuous light reception data indicating amounts of received continuous light is arranged; an intermittent light reception unit in which an intermittent light pixel that generates intermittent light reception data indicating an amount of received intermittent light is provided in correlation with each of the predetermined number of pixel blocks; and a distance measuring unit that generates distance data for each of the plurality of continuous light pixels on the basis of the intermittent light reception data and the continuous light reception data by energy minimization calculation as high-resolution distance data. In this way, an effect that the high-resolution distance data is generated by energy minimization calculation is obtained.

Moreover, in the second aspect, the distance measuring unit may include: a low-resolution distance data generation unit that generates distance data for each of the intermittent light pixels on the basis of the intermittent light reception data as low-resolution distance data; and an energy minimization calculation unit that generates the high-resolution distance data by the energy minimization calculation that minimizes a difference between the low-resolution distance data and an average value of the high-resolution distance data for each of the pixel blocks. In this way, an effect that the high-resolution distance data is generated by the energy minimization calculation that minimizes the difference between the low-resolution distance data and the average value of the high-resolution distance data for each of the pixel blocks is obtained.

Moreover, in the second aspect, the intermittent light reception data may include first, second, third, and fourth low-resolution charge signals, and the distance measuring unit may further include: a difference data generation unit that generates difference data between the first and second low-resolution charge signals and difference data between the third and fourth low-resolution charge signals for each of the intermittent light pixels as low-resolution difference data; an energy minimization calculation unit that generates high-resolution difference data by the energy minimization calculation that minimizes a difference between the low-resolution difference data and an average value of the high-resolution difference data for each of the pixel blocks; and a high-resolution difference data conversion unit that converts the high-resolution difference data to the high-resolution distance data for each of the continuous light pixels. In this way, an effect that the high-resolution difference data is generated by energy minimization calculation is obtained.

Moreover, in the second aspect, the intermittent light reception data may include first, second, third, and fourth low-resolution charge signals, and the distance unit may include: an energy minimization calculation unit that generates first, second, third, and fourth high-resolution charge signals by the energy minimization calculation that minimizes a difference between an average value of the first, second, third, and fourth high-resolution charge signals and the first, second, third, and fourth low-resolution charge signals for each of the pixel blocks; and a high-resolution charge signal conversion unit that converts the first, second, third, and fourth high-resolution charge signals to the high-resolution distance data. In this way, an effect that the first, second, third, and fourth high-resolution charge signals are generated by energy minimization calculation is obtained.

Effects of the Invention

According to the present technology, excellent effects that distance measurement accuracy can be improved in a device that measures a distance on the basis of a phase difference of light is provided. Incidentally, the effects described in the present specification are not necessarily limited to the effect described herein and may be any of the effects described in the present disclosure.

MODE FOR CARRYING OUT THE INVENTION

Hereinafter, modes (hereinafter referred to as embodiments) for carrying out the present technology will be described. The description will be given in the following order.

1. First embodiment (example in which average value and distance data are input to filter)
2. Second embodiment (example in which average value and difference data are input to filter)
3. Third embodiment (example in which average value and distance data are subjected to regression analysis)
4. Fourth embodiment (example in which average value and difference data are subjected to regression analysis)
5. Fifth embodiment (example in which distance data is subjected to energy minimization calculation)
6. Sixth embodiment (example in which difference data is subjected to energy minimization calculation)
7. Seventh embodiment (example in which charge signal is subjected to energy minimization calculation)
8. Application example to movable body

1. First Embodiment

[Configuration Example of Mobile Terminal]

Figure 1:
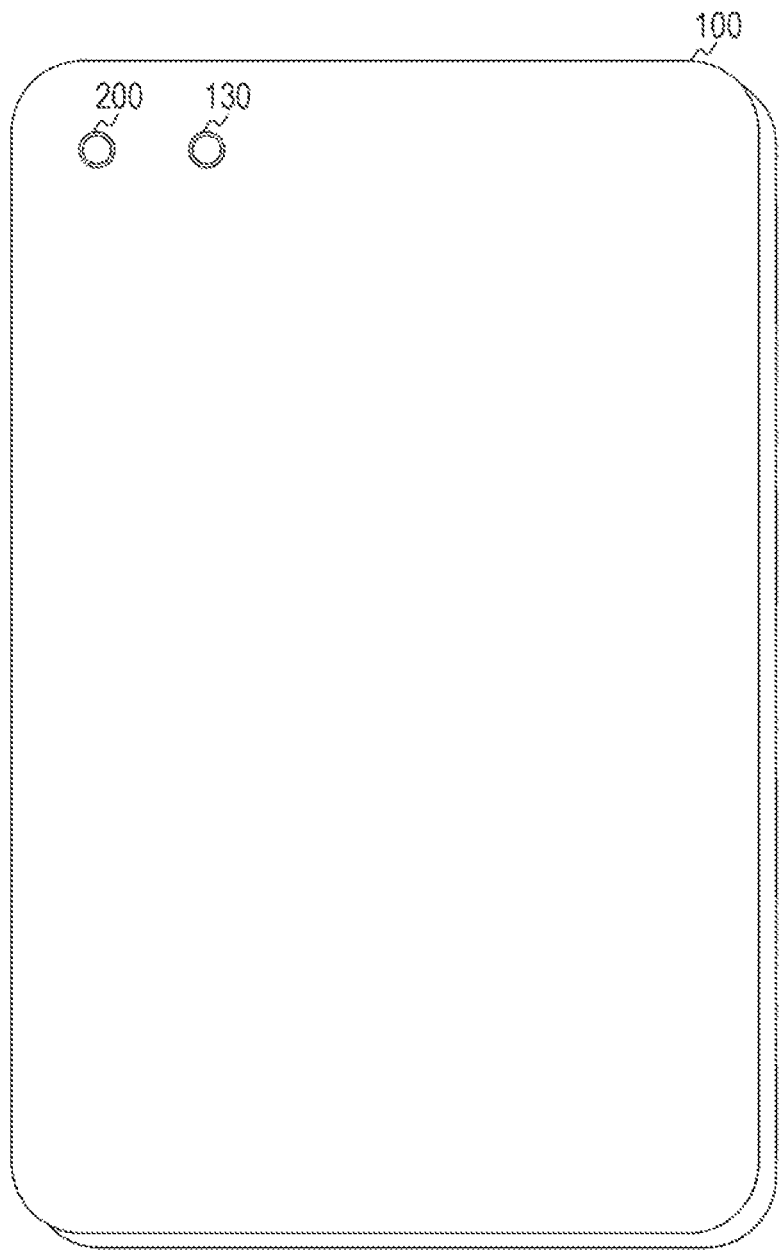
FIG. 1 is an example of a perspective view of a mobile terminal according to a first embodiment of the present technology.

FIG. 1 is an example of a perspective view of a mobile terminal 100 according to a first embodiment of the present technology. This diagram is a perspective view of the mobile terminal 100 when seen from an obliquely backward side with respect to a front side using the facing direction of the display of the mobile terminal 100 as the front side. A ToF sensor 200 is provided on a back surface of the mobile terminal 100. Moreover, on the back surface, a solid-state imaging element 130 is provided near the ToF sensor 200. Examples of the mobile terminal 100 include a smartphone, a tablet terminal, a notebook-type personal computer, and the like. Incidentally, the mobile terminal 100 is an example of a distance measuring device described in the claims.

Figure 2:
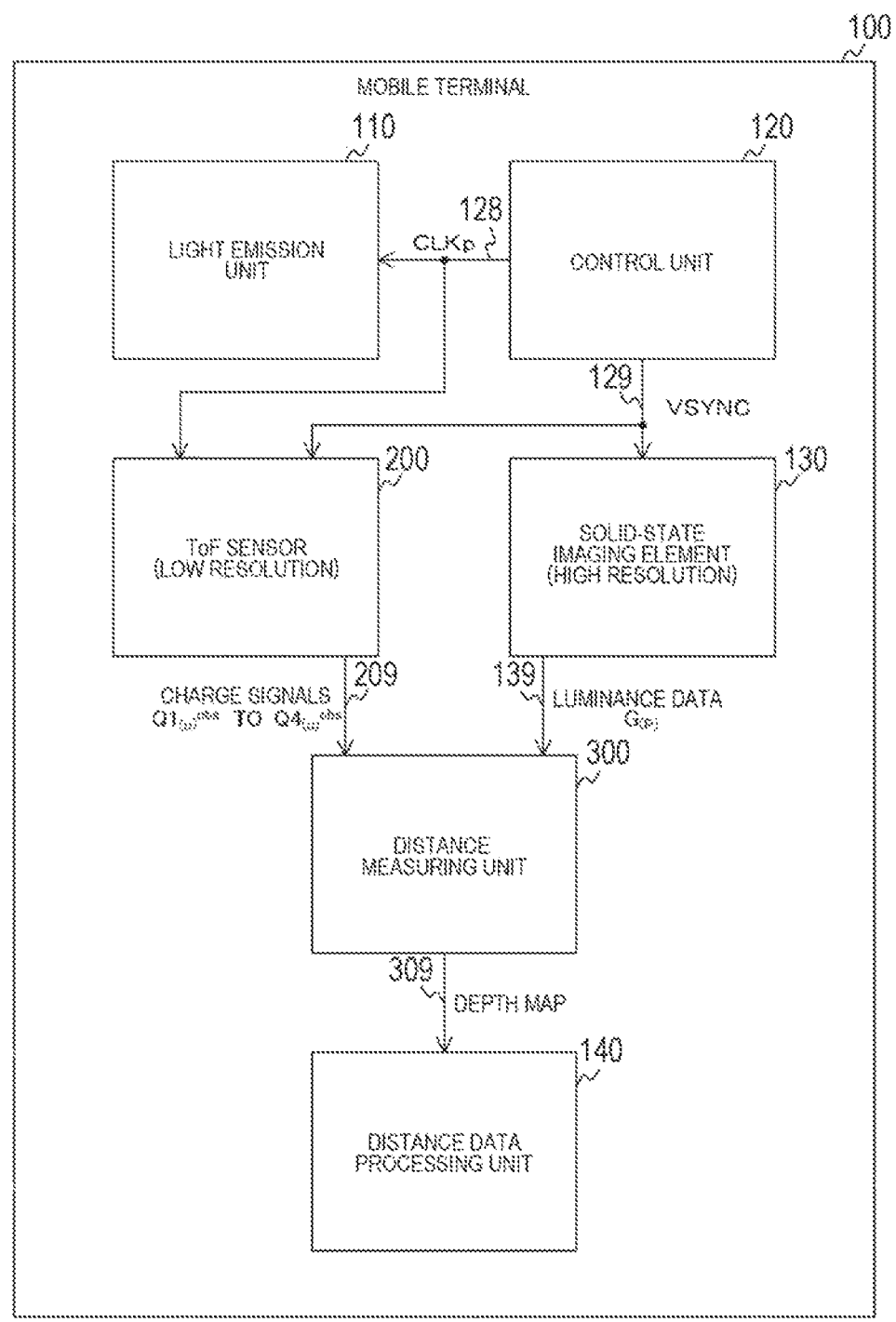
FIG. 2 is a block diagram illustrating a configuration example of a mobile terminal according to the first embodiment of the present technology.

FIG. 2 is a block diagram illustrating a configuration example of the mobile terminal 100 according to the first embodiment of the present technology. The mobile terminal 100 includes a light emission unit 110, a control unit 120, a ToF sensor 200, a solid-state imaging element 130, a distance measuring unit 300, and a distance data processing unit 140.

The light emission unit 110 emits intermittent light of which the brightness varies periodically to radiate light to an object. The light emission unit 110 generates intermittent light in synchronization with an emission control signal CLKp of rectangular waves, for example. Moreover, a light emitting diode is used as the light emission unit 110, for example, and near-infrared light or the like is used as the intermittent light. Incidentally, the emission control signal CLKp is not limited to rectangular waves as long as the signal is a periodic signal. For example, the emission control signal CLKp may be sinusoidal waves.

The control unit 120 controls the entire mobile terminal 100. The control unit 120 generates the emission control signal CLKp and supplies the same to the light emission unit 110 and the ToF sensor 200 via a signal line 128. The frequency of the emission control signal CLKp is 20 megahertz (MHz), for example. Incidentally, the frequency of the emission control signal CLKp is not limited to 20 megahertz (MHz) but may be 5 megahertz (MHz) or the like.

Moreover, the control unit 120 generates a vertical synchronization signal VSYNC having a lower frequency than the emission control signal CLKp and supplies the same to the ToF sensor 200 and the solid-state imaging element 130 via a signal line 129. For example, aperiodic signal of 60 hertz (Hz) is used as the vertical synchronization signal VSYNC. Incidentally, the frequency of the vertical synchronization signal VSYNC is not limited to 60 hertz (Hz) but may be 30 hertz (Hz) or 120 hertz (Hz).

The ToF sensor 200 photoelectrically converts intermittent light reflected from the surface of an object. A plurality of pixels are arranged in a 2-dimensional grid form in the ToF sensor 200. These pixels receive intermittent light reflected from the object surface, generates light reception data corresponding to the amounts of received light, and supplies the light reception data to the distance measuring unit 300 via a signal line 209. The light reception data of the respective pixels includes charge signals $Q1_{(u)}^{obs}$, $Q2_{(u)}^{obs}$, $Q3_{(u)}^{obs}$, and $Q4_{(u)}^{obs}$ Here, the subscript u indicates the pixel position in the ToF sensor 200. Incidentally, the ToF sensor 200 is an example of an intermittent light reception unit described in the claims. Moreover, the pixel of the ToF sensor 200 is an example of an intermittent light pixel described in the claims.

The solid-state imaging element 130 photoelectrically converts continuous light such as visible light, infrared light, or the like to generate image data. A plurality of pixels are arranged in a 2-dimensional grid form in the solid-state imaging element 130. Moreover, it is assumed that the area of a light receiving surface of the solid-state imaging element 130 is approximately the same as that of the ToF sensor 200, and the solid-state imaging element 130 has a larger number of pixels than the ToF sensor 200. That is, a pixel density (resolution) of the solid-state imaging element 130 is higher than the ToF sensor 200. The respective pixels on the solid-state imaging element 130 receive continuous light, generate light reception data corresponding to the amounts of received continuous light, and supply the light reception data to the distance measuring unit 300 via a signal line 139. The light reception data of each of the pixels does not include color information but includes luminance data $G_{(P)}$ only. Due to this, image data made up of these pieces of light reception data is monochrome image data. Moreover, the subscript P indicates the pixel position in the solid-state imaging element 130. Incidentally, the solid-state imaging element 130 is an example of a continuous light reception unit described in the claims. Moreover, the pixel of the solid-state imaging element 130 is a continuous light pixel described in the claims.

The distance measuring unit 300 measures the distance (that is, a depth) to an object on the basis of a charge signal from the ToF sensor 200 and luminance data from the solid-state imaging element 130 and enhances a resolution. The distance measuring unit 300 generates a depth map in which pieces of distance data of each pixel are arranged using the charge signals from the ToF sensor 200. As described above, since the number of pixels of the ToF sensor 200 is smaller than that of the solid-state imaging element 130, the resolution of the depth map generated from the charge signals is lower than the monochrome image data.

Further, the distance measuring unit 300 enhances the resolution of the depth map using monochrome image data. The distance measuring unit 300 supplies the resolution-enhanced depth map to the distance data processing unit 140 via a signal line 309.

The distance data processing unit 140 executes predetermined processing using the depth map. For example, image processing of shading to an extent corresponding to a distance, processing of detecting an object according to a distance and clipping out the object only, and the like are executed.

Incidentally, the light emission unit 110, the control unit 120, the ToF sensor 200, the solid-state imaging element 130, the distance measuring unit 300, and the distance data processing unit 140 are provided in the same device, these components may be arranged to be distributed to a plurality of apparatuses or devices. For example, the solid-state imaging element 130 and the ToF sensor 200 may be disposed in an external sensor module and the remaining components may be disposed in a notebook-type personal computer or a tablet terminal.

[Configuration Example of ToF Sensor]

Figure 3:
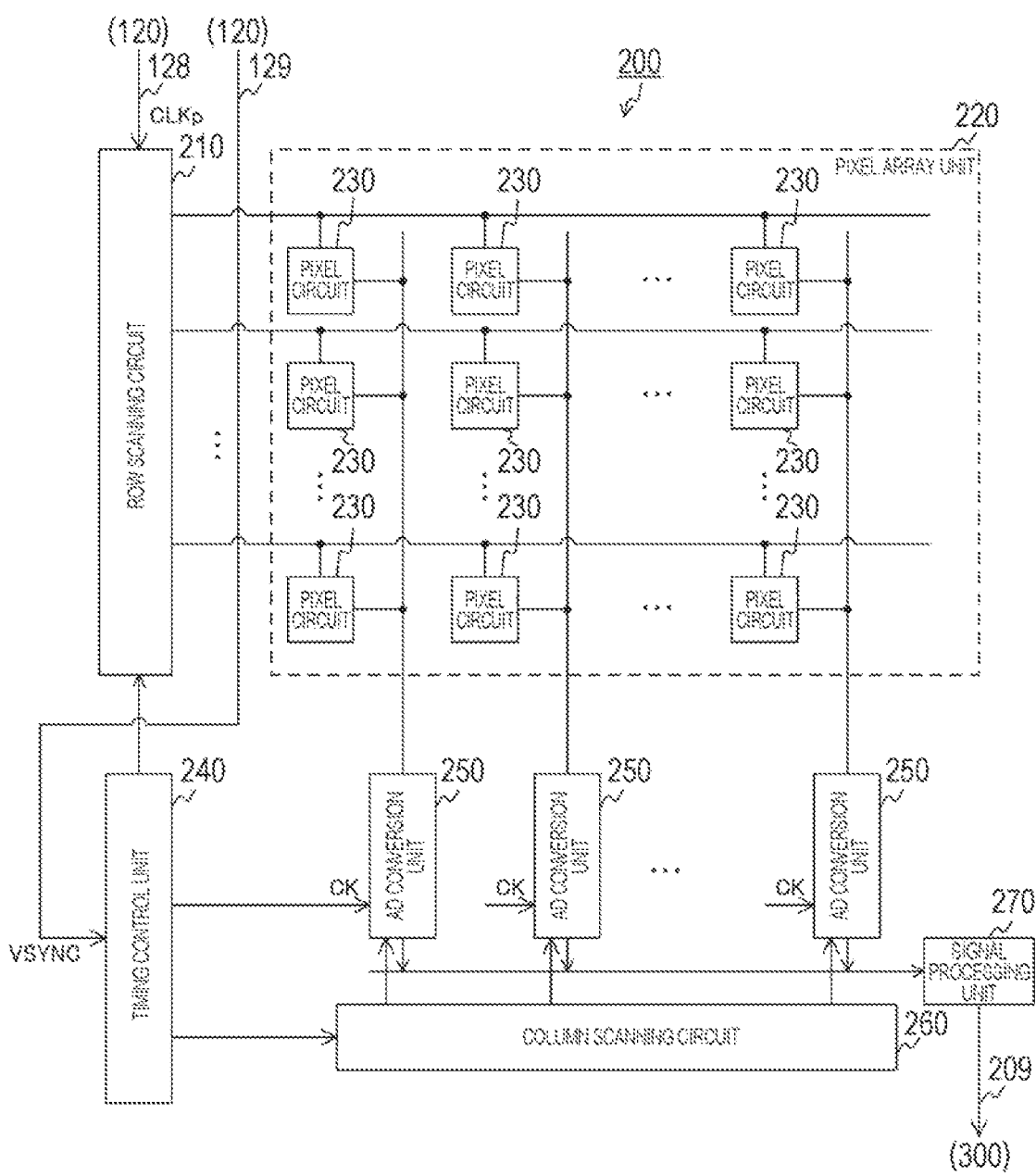
FIG. 3 is a block diagram illustrating a configuration example of a ToF sensor according to the first embodiment of the present technology.

FIG. 3 is a block diagram illustrating a configuration example of the ToF sensor 200 according to the first embodiment. The ToF sensor 200 includes a row scanning circuit 210, a pixel array unit 220, a timing control unit 240, a plurality of analog-to-digital (AD) conversion units 250, a column scanning circuit 260, and a signal processing unit 270. A plurality of pixel circuits 230 are arranged in a 2-dimensional grid form in the pixel array unit 220. Hereinafter, a set of pixel circuits 230 arranged in a predetermined direction will be referred to as "row" and a set of pixel circuits 230 arranged in a direction vertical to the row will be referred to as "column." The AD conversion unit 250 is provided in each column.

The timing control unit 240 controls the row scanning circuit 210, the AD conversion unit 250, and the column scanning circuit 260 in synchronization with the vertical synchronization signal VSYNC.

The row scanning circuit 210 simultaneously exposes all rows in synchronization with the emission control signal CLKp, sequentially selects rows after exposure ends, and outputs pixel signals. The pixel circuit 230 receives reflected light according to the control of the row scanning circuit 210 and outputs charge signals corresponding to the amounts of received light.

The AD conversion unit 250 performs AD-conversion on the charge signals from the corresponding columns. The AD conversion unit 250 outputs the AD-converted charge signals to the signal processing unit 270 according to the control of the column scanning circuit 260. The column scanning circuit 260 selects the AD conversion units 250 sequentially and outputs charge signals.

The signal processing unit 270 performs predetermined signal processing on the charge signals. The signal processing unit 270 supplies the processed charge signals to the distance measuring unit 300.

Incidentally, a lens for condensing reflected light is actually further provided in the ToF sensor 200, but this lens is omitted for the sake of convenience of illustration in FIG. 2.

[Configuration Example of Pixel Circuit]

Figure 4:
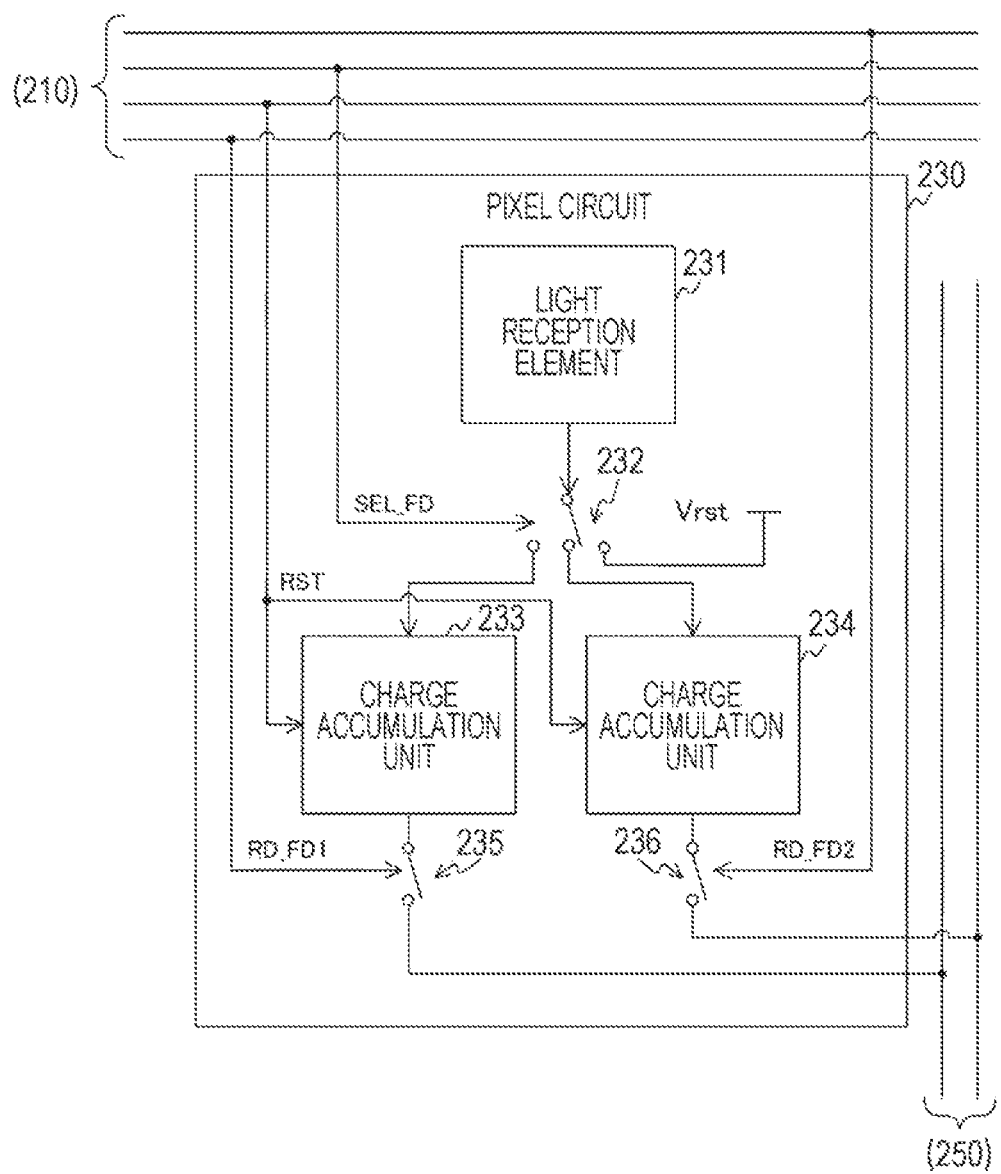
FIG. 4 is a block diagram illustrating a configuration example of a pixel circuit according to the first embodiment of the present technology.

FIG. 4 is a block diagram illustrating an example of the pixel circuit 230 according to the first embodiment. The pixel circuit 230 includes alight reception element 231, a transfer switch 232, charge accumulation units 233 and 234, and selection switches 235 and 236.

The light reception element 231 photoelectrically converts light to generate charge. For example, a photodiode is used as the light reception element 231.

The transfer switch 232 connects the light reception element 231 to any one of the charge accumulation unit 233, the charge accumulation unit 234, and a reset voltage source Vrst according to the control of the row scanning circuit 210. The transfer switch 232 is realized as a plurality of metal-oxide-semiconductor (MOS) transistors or the like, for example.

The charge accumulation units 233 and 234 accumulate charge to generate a voltage corresponding to the amount of accumulated charge. A floating diffusion layer is used as the charge accumulation units 233 and 234, for example.

The selection switch 235 opens and closes the path between the charge accumulation unit 233 and the AD conversion unit 250 according to the control of the row scanning circuit 210. The selection switch 236 opens and closes the path between the charge accumulation unit 234 and the AD conversion unit 250 according to the control of the row scanning circuit 210. For example, the selection switch 235 transitions to a closed state when an FD readout signal RD_FD1 is supplied by the row scanning circuit 210, and the selection switch 236 transitions to a closed state when an FD readout signal RD_FD2 is supplied by the row scanning circuit 210. Each of the selection switches 235 and 236 is realized by a MOS transistor or the like, for example.

Figure 5:
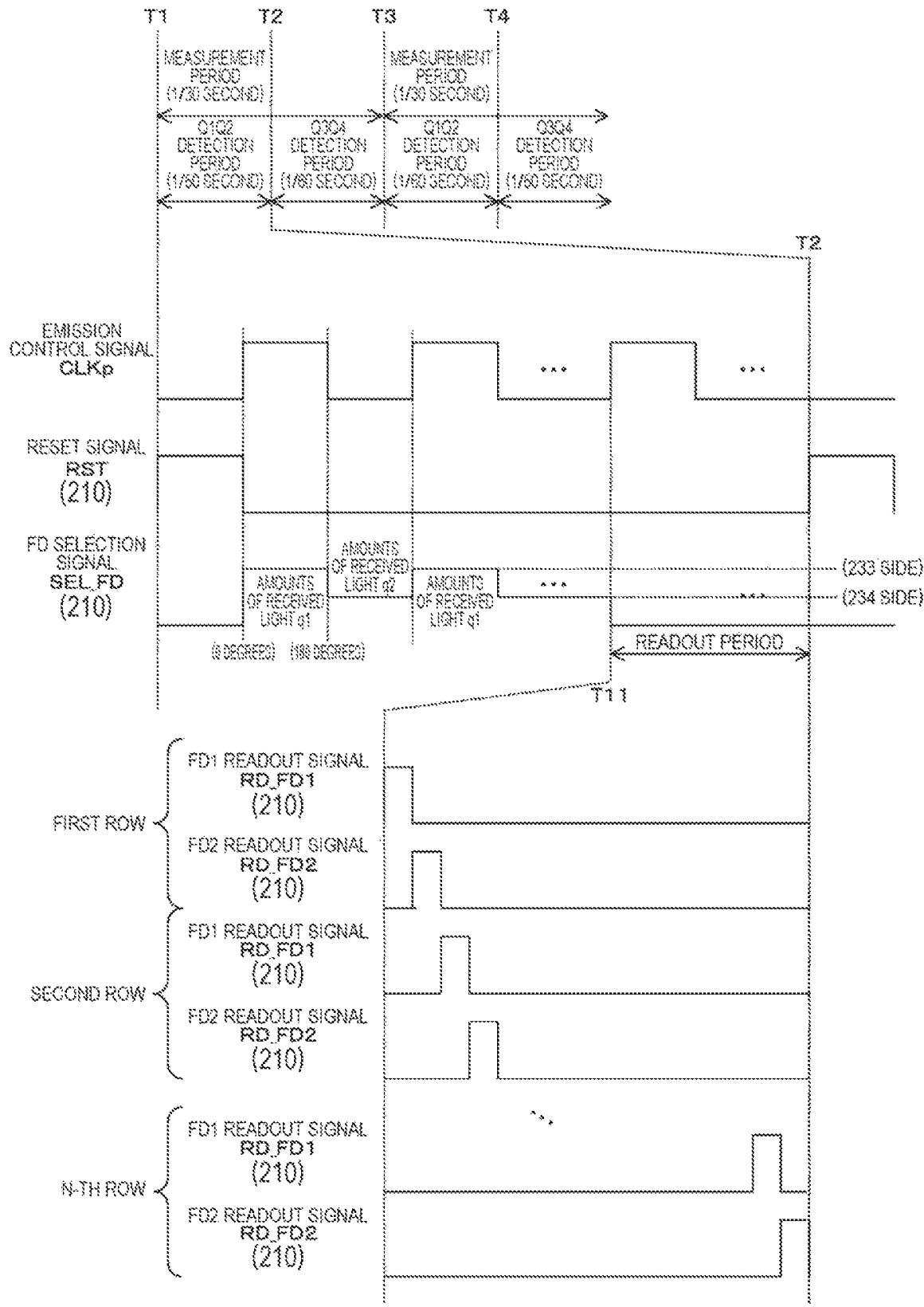
FIG. 5 is a timing chart illustrating an example of exposure control of a pixel circuit in a Q1Q2 detection period according to the first embodiment of the present technology.

FIG. 5 is a timing chart illustrating an example of pixel exposure control in a Q1Q2 detection period according to the first embodiment. When radiation of intermittent light starts, the pixel circuit 230 repeatedly performs generation of charge signals $Q1_{(u)}^{obs}$ and $Q2_{(u)}^{obs}$ and generation of charge signals $Q3_{(u)}^{obs}$ and $Q4_{(u)}^{obs}$ alternately. Hereinafter, the detection period of charge signals $Q1_{(u)}^{obs}$ and $Q2_{(u)}^{obs}$ will be referred to as "Q1Q2 detection period" and the detection period of charge signals $Q3_{(u)}^{obs}$ and $Q4_{(u)}^{obs}$ will be referred to as "Q3Q4 detection period." The length of each of the Q1Q2 detection period and the Q3Q4 detection period is the cycle period (for example, ⅟60 seconds) of the vertical synchronization signal VSYNC. Moreover, a period made up of the Q1Q2 detection period and Q3Q4 detection period will be referred to as a "distance measuring period." This distance measuring period is a period (for example, ⅟30 seconds) corresponding to two cycle periods of the vertical synchronization signal VSYNC.

Here, the charge signal $Q1_{(u)}^{obs}$ is a signal that accumulates the amounts of received light q1 of phases of 0 degrees to 180 degrees over the Q1Q2 detection period using a specific phase (for example, a rising edge) of the emission control signal CLKp of intermittent light as 0 degrees. Since the frequency of the emission control signal CLKp is as high as 20 megahertz (MHz), the amount of received light per one cycle period (⅟20 microseconds) is very small and is difficult to detect. Due to this, the pixel circuit 230 accumulates the amounts of received light q1 over the Q1Q2 detection period such as ⅟60 seconds longer than the cycle period (⅟20 microseconds) of the emission control signal CLKp and generates a signal indicating the total amount as the charge signal $Q1_{(u)}^{obs}$. Moreover, the charge signal $Q2_{(u)}^{obs}$ is a signal that accumulates the amounts of received reflected light q2 of the phases of 180 degrees to 360 degrees over the Q1Q2 detection period.

Moreover, the charge signal $Q3_{(u)}^{obs}$ is a signal that accumulates the amounts of received reflected light q3 of the phases of 90 degrees to 270 degrees over the Q3Q4 detection period. Moreover, the charge signal $Q4_{(u)}^{obs}$ is a signal that accumulates the amounts of received reflected light q4 of the phases of 270 degrees to 90 degrees over the Q3Q4 detection period.

The mobile terminal 100 can calculate the distance to the object for each pixel on the basis of the charge signals $Q1_{(u)}^{obs}$, $Q2_{(u)}^{obs}$, $Q3_{(u)}^{obs}$, and $Q4_{(u)}^{obs}$.

For example, the charge signals $Q1_{(u)}^{obs}$ and $Q2_{(u)}^{obs}$ are detected in the Q1Q2 detection period from timing T1 to timing T2. First, the row scanning circuit 210 supplies a reset signal RST to all rows in a predetermined pulse period from the timing T1. With this reset signal RST, the amounts of charge accumulated in the charge accumulation units 233 and 234 of all rows are initialized.

Further, the row scanning circuit 210 supplies a high-level FD selection signal SEL_FD to all rows over the phases of 0 degrees to 180 degrees within the cycle period of the emission control signal CLKp in the Q1Q2 detection period so that the charge generated by the light reception element 231 is transferred to the charge accumulation unit 233. With this control, the amount of received light q1 is accumulated in the charge accumulation unit 233.

Moreover, the row scanning circuit 210 supplies a middle-level FD selection signal SEL_FD to all rows over the phases of 180 degree to 360 degrees within the cycle period of the emission control signal CLKp in the Q1Q2 detection period so that the charge generated by the light reception element 231 is transferred to the charge accumulation unit 234. With this control, the amount of received light q2 is accumulated in the charge accumulation unit 234.

Further, at timing T11 immediately before the timing T2, the row scanning circuit 210 supplies FD readout signals RD_FD1 and RD_FD2 sequentially to the first row. With this control the charge signals $Q1_{(u)}^{obs}$ and $Q2_{(u)}^{obs}$ of the first row are read. Subsequently, the row scanning circuit 210 supplies FD readout signals RD_FD1 and RD_FD2 sequentially to the second row to readout the charge signals. Hereinafter, similarly, the row scanning circuit 210 selects rows sequentially to readout charge signals.

In this manner, in the Q1Q2 detection period, each of the pixel circuits 230 generates the charge signal $Q1_{(u)}^{obs}$ of the phases of 0 degrees to 180 degrees and the charge signal $Q2_{(u)}^{obs}$ of the phases of 180 degrees to 360 degrees.

Figure 6:
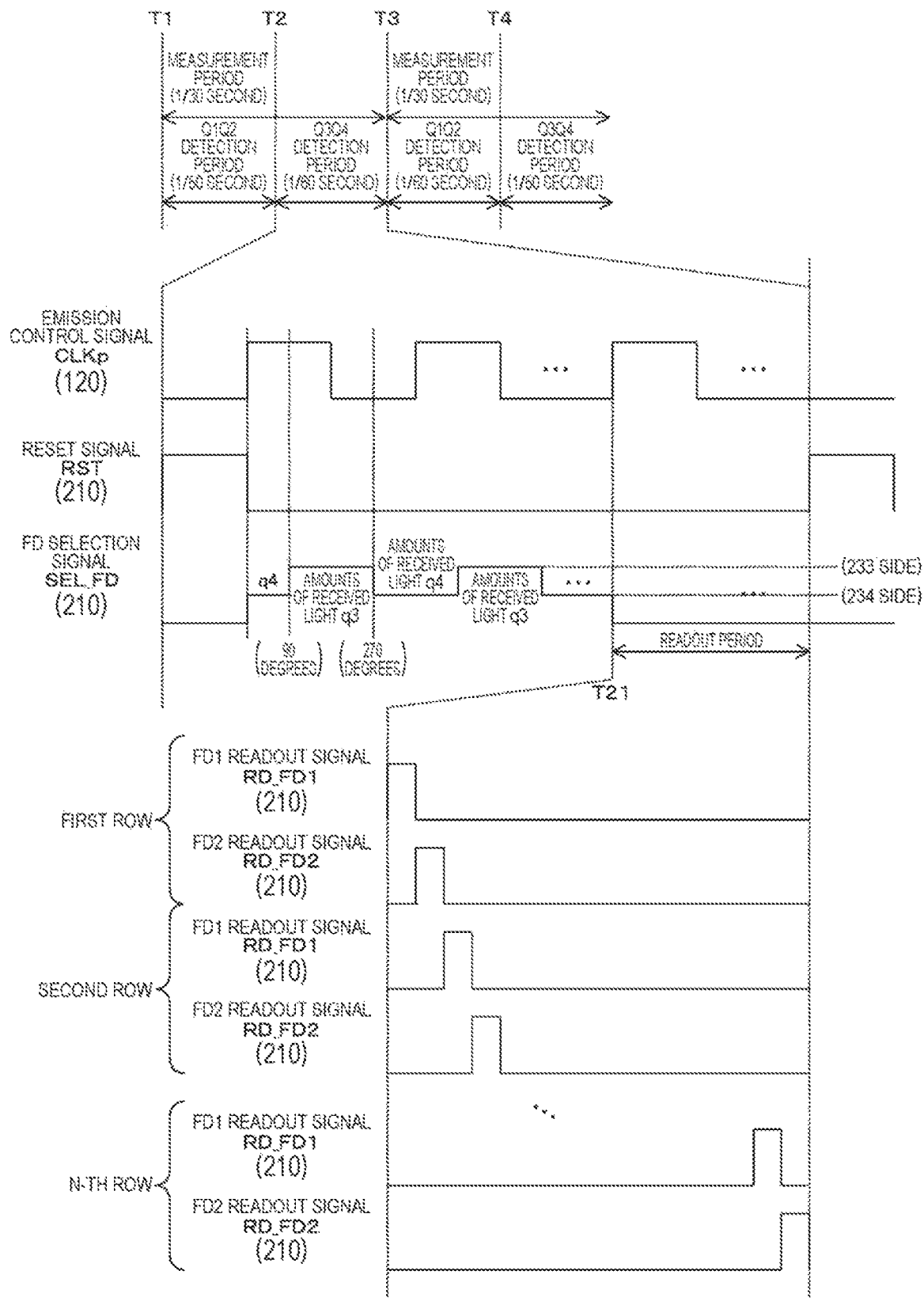
FIG. 6 is a timing chart illustrating an example of exposure control of a pixel circuit in a Q3Q4 detection period according to the first embodiment of the present technology.

FIG. 6 is a timing chart illustrating an example of exposure control of the pixel circuit 230 in the Q3Q4 detection period according to the first embodiment. For example, charge signals $Q3_{(u)}^{obs}$ and $Q4_{(u)}^{obs}$ are generated in the Q3Q4 detection period from timing T2 to timing T3. First, the row scanning circuit 210 supplies the reset signal RST to all rows over a predetermined pulse period from the timing T2. Moreover, the row scanning circuit 210 supplies a low-level FD selection signal SEL_FD to initialize the charge of the light reception elements 231 of all rows.

Further, the row scanning circuit 210 supplies a middle-level FD selection signal SEL_FD to all rows over the phases of the first 0 degrees to 90 degrees so that the charge generated by the light reception element 231 is transferred to the charge accumulation unit 234. With this control, the amount of received light q4 is accumulated in the charge accumulation unit 234. After that, the row scanning circuit 210 supplies a high-level FD selection signal SEL_FD to all rows over the phases of 90 degrees to 270 degrees within the cycle period of the emission control signal CLKp so that the charge generated by the light reception element 231 is transferred to the charge accumulation unit 233. With this control, the amount of received light q3 is accumulated in the charge accumulation unit 233.

Moreover, the row scanning circuit 210 supplies a middle-level FD selection signal SEL_FD to all rows over the phases of 270 degrees to 90 degrees within the cycle period of the emission control signal CLKp in the Q3Q4 detection period so that the charge generated by the light reception element 231 is transferred to the charge accumulation unit 234. With this control, the amount of received light q4 is accumulated in the charge accumulation unit 234.

Further, at timing T21 immediately before the timing T3, the row scanning circuit 210 supplies FD readout signals RD_FD1 and RD_FD2 sequentially to the first row. With this control, the charge signals $Q3_{(u)}^{obs}$ and $Q4_{(u)}^{obs}$ of the first row are read. Hereinafter, similarly, the row scanning circuit 210 selects rows sequentially to readout charge signals.

In this manner, in the Q3Q4 detection period, each of the pixel circuits 230 generates the charge signal $Q3_{(u)}^{obs}$ of the phases of 90 degrees to 270 degrees and the charge signal $Q4_{(u)}^{obs}$ of the phases of 270 degrees to 90 degrees.

[Configuration Example of Solid-State Imaging Element]

Figure 7:
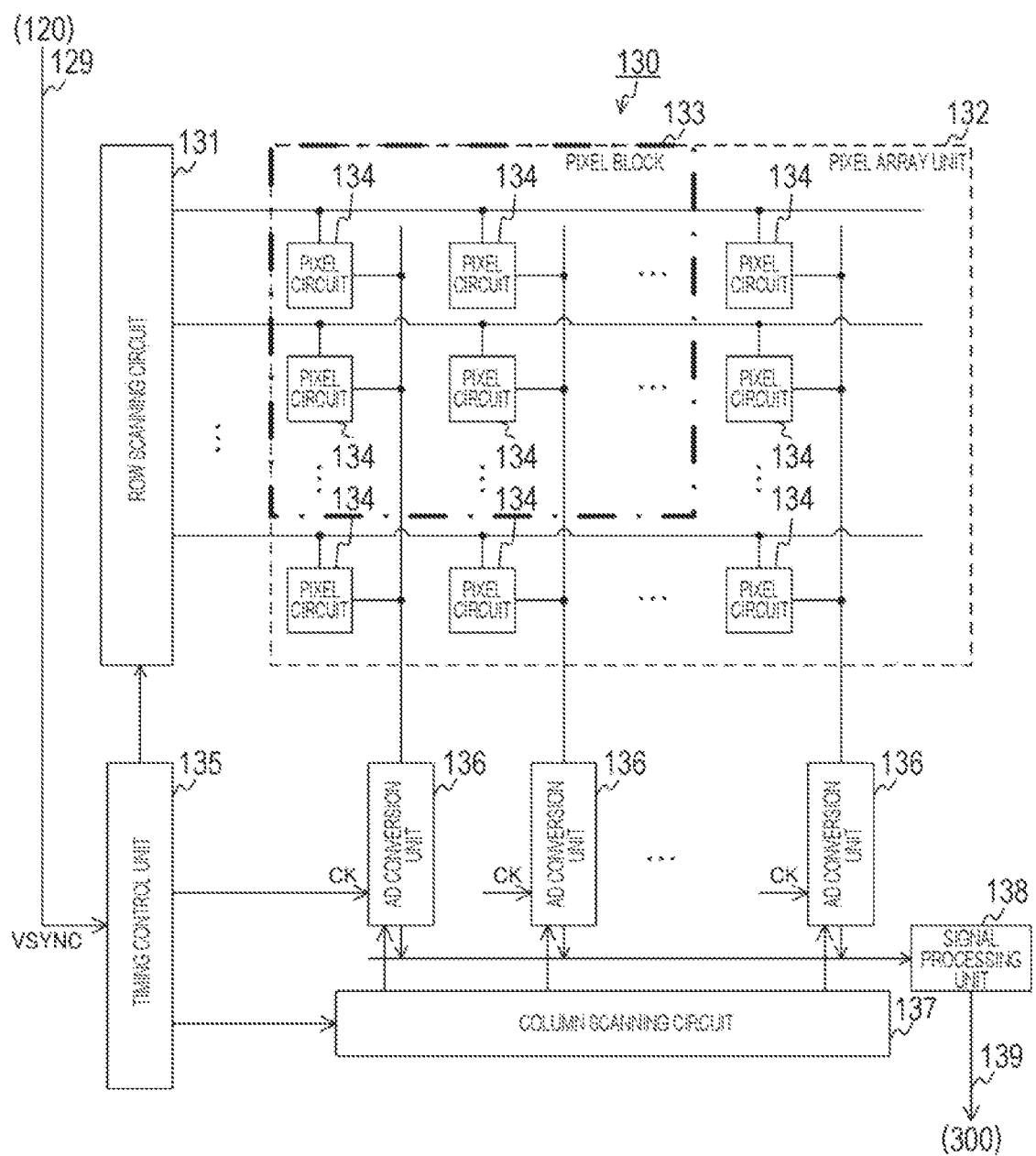
FIG. 7 is a block diagram illustrating a configuration example of a solid-state imaging element according to the first embodiment of the present technology.

FIG. 7 is a block diagram illustrating a configuration example of the solid-state imaging element 130 according to the first embodiment of the present technology. The solid-state imaging element 130 includes a row scanning circuit 131, a pixel array unit 132, a timing control unit 135, a plurality of AD conversion units 136, a column scanning circuit 137, and a signal processing unit 138. Moreover, a plurality of pixel circuits 134 is arranged in a 2-dimensional grid form in the pixel array unit 132. A pixel density of the solid-state imaging element 130 is higher than the ToF sensor 200 as described above, and the solid-state imaging element 130 is provided near the ToF sensor 200. One pixel of the ToF sensor 200 measures an average distance to a surface on an object within a certain angular range. The surface measured by the one pixel is imaged by a plurality of pixels on the solid-state imaging element 130. Due to this, in a case where intermittent light reflected from a predetermined reflection position of a certain object surface is incident on one pixel on the ToF sensor 200, the continuous light from the reflection position is incident on a plurality of pixels on the solid-state imaging element 130. In this manner, a region made up of a plurality of pixel circuits 134 corresponding to one pixel on the ToF sensor 200 will be referred to as a pixel block 133.

For example, a case in which a total number of pixels of the ToF sensor 200 is M (M is an integer) and N pixels (N is an integer of two or more) on the solid-state imaging element 130 correspond to one pixel on the ToF sensor 200 will be considered. In this case, the number of pixel blocks 133 is M, and a total number of pixels of the solid-state imaging element 130 is N×M. In the solid-state imaging element 130, a set of pixel circuits 134 arranged in a predetermined direction will be referred to as "row" and a set of pixel circuits 134 arranged in a direction vertical to the row is referred to as "column." The AD conversion unit 136 is provided in each column.

The timing control unit 135 controls the row scanning circuit 131, the AD conversion unit 136, and the column scanning circuit 137 in synchronization with the vertical synchronization signal VSYNC.

The row scanning circuit 131 selects respective rows to output a luminance signal. The pixel circuit 134 receives continuous light according to the control of the row scanning circuit 131 and outputs a luminance signal corresponding to the amount of received light.

The AD conversion unit 136 performs AD conversion on a luminance signal from a corresponding row. The AD conversion unit 136 outputs the AD-converted luminance signal to the signal processing unit 138 as luminance data according to the control of the column scanning circuit 137. The column scanning circuit 137 selects the AD conversion units 136 sequentially to output luminance data.

The signal processing unit 138 performs signal processing such as CDS processing on the luminance data. The signal processing unit 138 supplies the processed luminance data to the distance measuring unit 300.

As described above, the distance measuring period of the ToF sensor 200 is twice the cycle period of the vertical synchronization signal VSYNC. Following the operation of the ToF sensor 200, the solid-state imaging element 130 generates one piece of monochrome image data every distance measuring period (two cycle periods).

Figure 8:
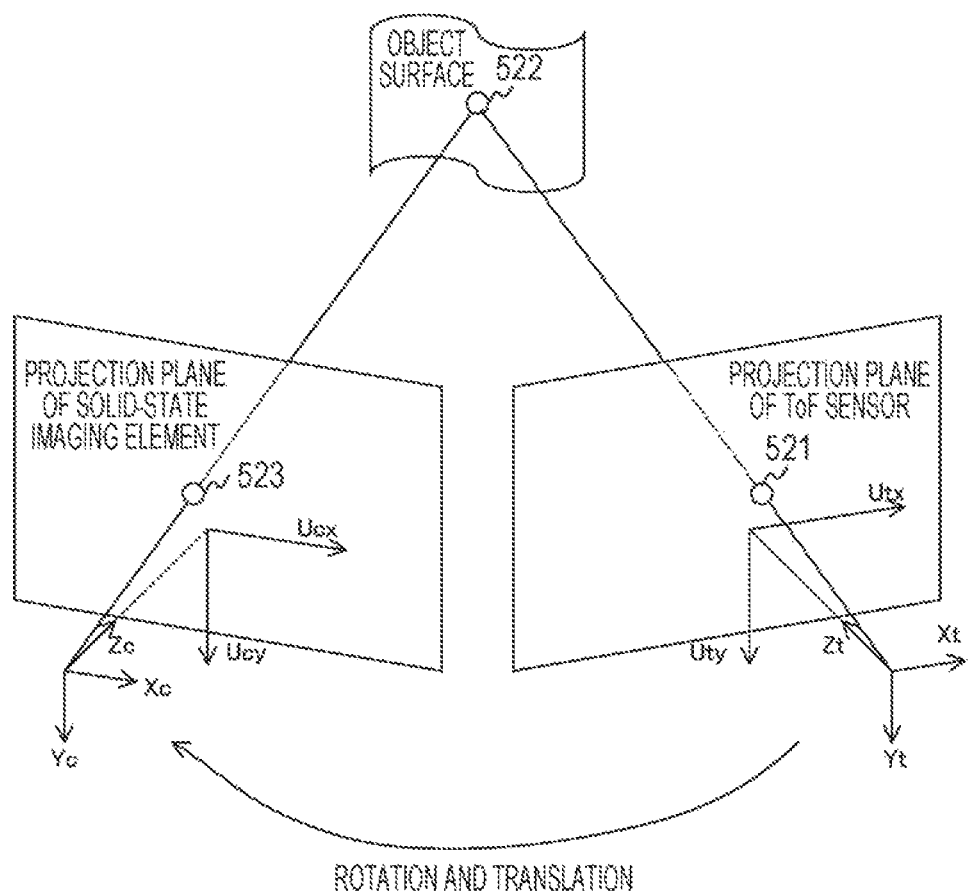
FIG. 8 is a diagram illustrating an example of a positional relation of pixels on projection planes of a solid-state imaging element and a ToF sensor according to the first embodiment of the present technology.

FIG. 8 is a diagram illustrating an example of a positional relation of pixels on respective projection planes of the solid-state imaging element 130 and the ToF sensor 200 according to the first embodiment of the present technology.

A coordinate system of which the origin is at the center of an optical axis of the ToF sensor 200 is defined as (Xt,Yt,Zt), and a coordinate system of which the origin is at the center of an optical axis of the solid-state imaging element 130 is defined as (Xc,Yc,Zc). Transformation from one coordinate system to another coordinate system is performed by a 3×3 rotation matrix R and a 3-dimensional translation vector T. These rotation matrix R and the translation vector T are known values and are uniquely determined by a positional relation between respective optical systems of the solid-state imaging element 130 and the ToF sensor 200.

Here, when a focal distance of a lens associated with the ToF sensor 200 is Ft, the value of the Zt-coordinate on the projection plane of the ToF sensor 200 is a known Ft. Moreover, $(0,0,Ft)^t$ is the origin of a coordinate system (Utx,Uty) of the projection plane of the ToF sensor 200. The Xt-axis and the Utx-axis are parallel. Moreover, the Yt-axis and the Uty-axis are parallel.

Moreover, when a focal distance of a lens associated with the solid-state imaging element 130 is Fc, the value of the Zc-coordinate on the projection plane of the solid-state imaging element 130 is a known Fc. Moreover, $(0,0,Fc)^t$ is the origin of a coordinate system (Ucx,Ucy) of the projection plane of the solid-state imaging element 130. Moreover, the Xc-axis and the Ucx-axis are parallel. Moreover, the Yc-axis and the Ucy-axis are parallel.

When focusing on the position 521 on the projection plane of the ToF sensor 200, the position 521 (that is, a pixel position U) is represented by the following equation using the coordinates on a 2-dimensional plane.

[Math. 1]

$$U = \begin{bmatrix} U_X \\ U_Y \end{bmatrix} \quad \text{Equation 1}$$

In the coordinate system (Xt,Yt,Zt) corresponding to the ToF sensor 200, a direction to a reflection point 522 of an object surface projected at the position 521 can be represented by $(Ux,Uy,Ft)^t$ by Equation 1. Here, the superscript t means translocation. In a case where the distance $D_{(U)}$ from the center of the optical axis of the ToF sensor 200 to the reflection point 522 is measured, a 3-dimensional position Pr of the reflection point 522 can be represented by the following equation on the basis of the distance data $D_{(U)}$ and the direction $(Ux,Uy,Ft)^t$.

[Math. 2]

$$Pr = \frac{D_{(U)}}{\sqrt{U_X^2 + U_Y^2 + F_t^2}} \begin{bmatrix} U_X \\ U_Y \\ F_t \end{bmatrix} \quad \text{Equation 2}$$

In the coordinate system corresponding to the solid-state imaging element 130, the position indicated by Equation 2 can be represented by the following equation using the rotation matrix R and the translation vector T.

[Math. 3]

$$\begin{bmatrix} X_{(U)} \\ Y_{(U)} \\ Z_{(U)} \end{bmatrix} = \frac{D_{(U)}}{\sqrt{U_X^2 + U_Y^2 + F_t^2}} R \begin{bmatrix} U_X \\ U_Y \\ F_t \end{bmatrix} + T \quad \text{Equation 3}$$

A 2-dimensional position Pp of a position 523 at which the reflection point 522 is projected on the projection plane of the solid-state imaging element 130 can be represented by the following equation in the coordinate system (Ucx,Ucy) of the projection plane.

[Math. 4]

$$Pp = \begin{bmatrix} \frac{F_c \cdot X_{(U)}}{Z_{(U)}} \\ \frac{F_c \cdot Y_{(U)}}{Z_{(U)}} \end{bmatrix} \quad \text{Equation 4}$$

To summarize, an object projected at the position 521 (the pixel position U) on the projection plane of the ToF sensor 200 is projected at the position 523 of Equation 4 on the projection plane of the solid-state imaging element 130. The coordinate of the right side of Equation 4 is defined by Equation 3.

Next, the number of pixels of the solid-state imaging element 130 to which one pixel of the ToF sensor 200 corresponds will be considered. A certain pixel and a pixel adjacent thereto perform imaging or distance measurement on angles which are different by an amount corresponding to a reciprocal of the focal distance. Therefore, the distance measurement range of one pixel of the ToF sensor 200 is "Fc/Ft" times the imaging range of the solid-state imaging element 130 with respect to the vertical direction. The same is applied to the horizontal direction. That is, the distance measurement range of one pixel of the ToF sensor 200 is a rectangular region in which one side of the solid-state imaging element 130 is Fc/Ft pixels. Here, since the solid-state imaging element 130 has a higher resolution than the ToF sensor 200, Fc is larger than Ft.

On the basis of the above-mentioned relation, the distance measuring unit 300 upsamples the distance data generated by the ToF 200. Here, a plurality of square grids of which the length is one is assumed to be drawn on the ToF sensor 200, and distance measuring data is considered to be generated for each of these square grids. In this case, by the upsampling, distance data is generated for each of square grids of which the length is "Ft/Fc." When a set of positions of square grids having the length of one is L, the pixel position u before the upsampling is represented by the following equation.

[Math. 5]

$$u \equiv \begin{bmatrix} u_X \\ u_Y \end{bmatrix} \in L \qquad \text{Equation 5}$$

Moreover, when a set of positions of square grids of which the length is "Ft/Fc" is H, the pixel position U after the upsampling is represented by the following equation.

[Math. 6]

$$U \equiv \begin{bmatrix} u_X \\ u_Y \end{bmatrix} \in H \qquad \text{Equation 6}$$

[Configuration Example of Distance Measuring Unit]

Figure 9:
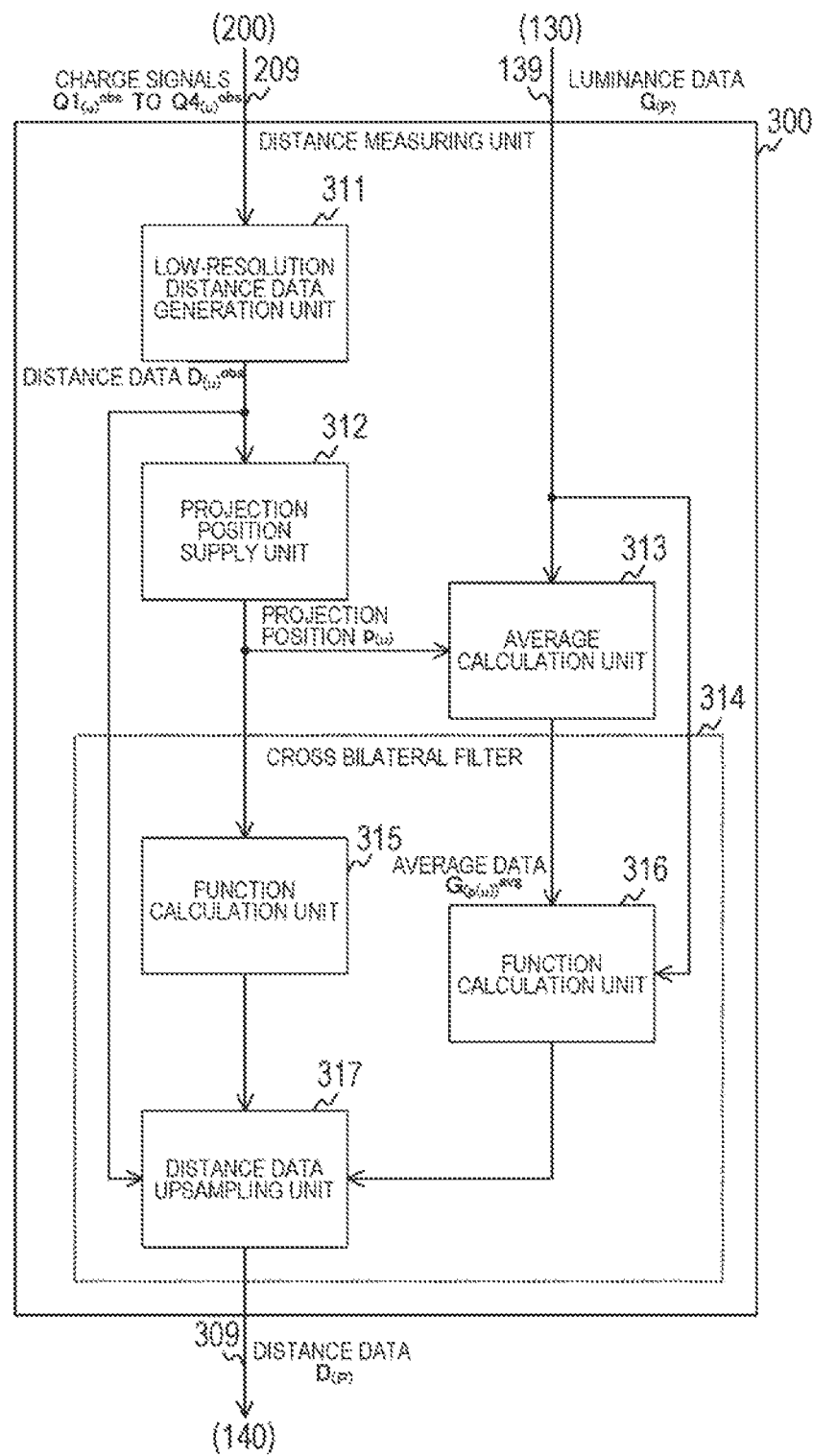
FIG. 9 is a block diagram illustrating a configuration example of a distance measuring unit according to the first embodiment of the present technology.

FIG. 9 is a block diagram illustrating a configuration example of the distance measuring unit 300 according to the first embodiment of the present technology. The distance measuring unit 300 includes a low-resolution distance data generation unit 311, a projection position supply unit 312, an average calculation unit 313, and a cross bilateral filter 314.

The low-resolution distance data generation unit 311 generates distance data $D_{(u)}^{obs}$ for each pixel of the ToF sensor 200 on the basis of a charge signal. The distance data $D_{(u)}^{obs}$ is calculated by the following equations, for example.

[Math. 7]

$$I_{(u)}^{obs} \equiv Q1_{(u)}^{obs} - Q2_{(u)}^{obs} \qquad \text{Equation 7}$$

[Math. 8]

$$Q_{(u)}^{obs} \equiv Q3_{(u)}^{obs} - Q4_{(u)}^{obs} \qquad \text{Equation 8}$$

[Math. 9]

$$D_{(u)}^{obs} \equiv \frac{c}{4\pi f} \cdot \arctan\left(\frac{Q_{(u)}^{obs}}{I_{(u)}^{obs}}\right) \qquad \text{Equation 9}$$

Here, the unit of the distance data $D_{(u)}^{obs}$ in Equation 9 is meter (m), for example. The constant c is the velocity of light and the unit is meters per second (m/s), for example. The function arctan( ) indicates an inverse function of a tangent function. In Equations 7 to 9, $I_{(u)}^{obs}$ and $Q_{(u)}^{obs}$ are difference data of charge signals.

The low-resolution distance data generation unit 311 supplies the generated distance data $D_{(u)}^{obs}$ to the projection position supply unit 312 and the cross bilateral filter 314 as low-resolution distance data.

The projection position supply unit 312 calculates the projection position $p_{(u)}$ on the solid-state imaging element 130 corresponding to the pixel position u on the ToF sensor 200.

The projection position supply unit 312 acquires the X-coordinate $u_x$ and the Y-coordinate $u_y$ of the pixel position u and calculates the projection position $p_{(u)}$ according to the following equation.

[Math. 10]

$$P_{(u)} \equiv \begin{bmatrix} \dfrac{F_c \cdot X_{(u)}}{Z_{(u)}} \\ \dfrac{F_c \cdot Y_{(u)}}{Z_{(u)}} \end{bmatrix} \qquad \text{Equation 10}$$

$X_{(u)}$, $Y_{(u)}$, and $Z_{(u)}$ on the right side of Equation 10 are represented by the following equation.

[Math. 11]

$$\begin{bmatrix} X_{(u)} \\ Y_{(u)} \\ Z_{(u)} \end{bmatrix} \equiv \frac{D_{(u)}^{obs}}{\sqrt{u_X^2 + u_Y^2 + F_t^2}} R \begin{bmatrix} u_X \\ u_Y \\ F_t \end{bmatrix} + T \qquad \text{Equation 11}$$

A square region of which the length of one side is Fc/Ft around the projection position $p_{(u)}$ calculated by Equations 10 and 11 corresponds to the pixel block 133. The projection position supply unit 312 supplies the projection position $p_{(u)}$ to the cross bilateral filter 314 and the average calculation unit 313.

The average calculation unit 313 calculates an average value of the luminance data $G_{(P)}$ for each pixel block 133. The average calculation unit 313 calculates the average data $G_{(p(u))}^{avg}$ for each of the projection positions $p_{(u)}$ by the following equation.

[Math. 12]

$$G_{(p(u))}^{avg} \equiv \frac{\sum_{V \in Mp(u)} G_{(V)}}{N} \qquad \text{Equation 12}$$

In the above equations, Mp(u) indicates a set of pixel positions V in the pixel block 133 corresponding to the projection position $p_{(u)}$. Moreover, $G_{(v)}$ indicates the luminance data of the pixel position V. N indicates the number of pixels in the pixel block 133.

The average calculation unit 313 supplies the average data $G_{(p(u))}^{avg}$ calculated by Equation 12 to the cross bilateral filter 314.

The cross bilateral filter 314 includes function calculation units 315 and 316 and a distance data upsampling unit 317.

The function calculation unit 315 inputs the Euclid distance between the pixel position P in the pixel block 133 and the projection position $p_{(u)}$ to a Gauss function h( ) so that the larger the Euclid distance, the smaller the weight becomes. The function calculation unit 315 supplies the calculation result h( ) to the distance data upsampling unit 317.

The function calculation unit 316 inputs an absolute value of the difference between the luminance data $G_{(P)}$ in the pixel block 133 and the average data $G_{(p(u))}^{avg}$ to a Gauss function g( ) so that the larger the absolute difference value, the smaller the weight becomes. The function calculation unit 316 supplies the calculation result g( ) to the distance data upsampling unit 317.

The distance data upsampling unit 317 upsamples the low-resolution distance data $D_{(u)}^{obs}$ by the following equations. Here, the set Ω with the subscript P indicates a set of pixel positions near the position P on the monochrome image sensor 200.

[Math. 13]

$$D_{(P)} = \frac{1}{k_{(P)}} \sum_{\{u|p(u)\in\Omega_P\}} \{D^{obs}_{(u)} \times h(\|P - p_{(u)}\|) \times g(\|G_{(P)} - G^{avg}_{(p(u))}\|)\}$$

Equation 13

[Math. 14]

$$k_{(P)} \equiv \sum_{\{u|p(u)\in\Omega_P\}} \{h(\|P - p_{(u)}\|) \times g(\|G_{(P)} - G^{avg}_{(p(u))}\|)\}$$

Equation 14

The distance data upsampling unit 317 supplies the distance data $D_{(P)}$ calculated using Equations 13 and 14 to the distance data processing unit 140 as high-resolution distance data.

Incidentally, although the distance measuring unit 300 performs upsampling using the cross bilateral filter 314, the filter to be used is not limited to the cross bilateral filter 314 as long as upsampling can be performed.

Figure 10:
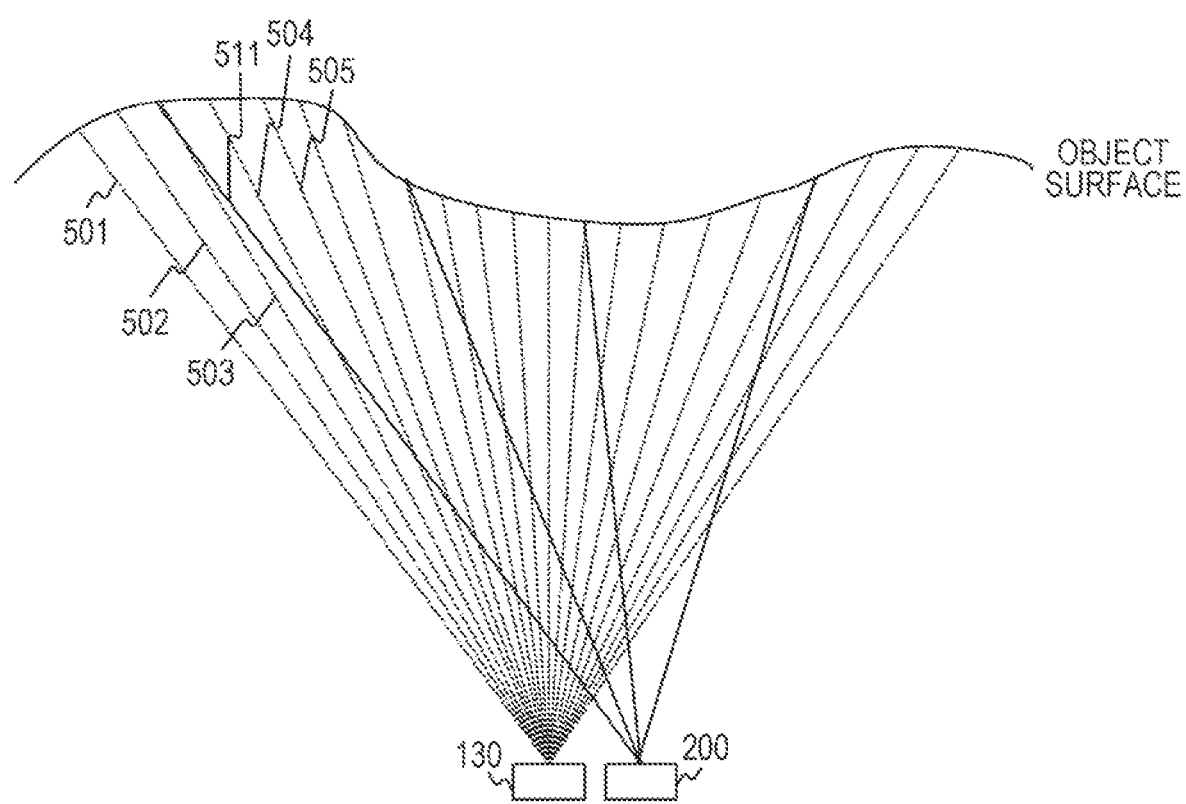
FIG. 10 is a diagram illustrating an example of a relation between rays of continuous light received by a solid-state imaging element and rays of intermittent light received by a ToF sensor according to the first embodiment of the present technology.

FIG. 10 is a diagram illustrating an example of a relation between rays of continuous light received by the solid-state imaging element 130 and rays of intermittent light received by the ToF sensor 200 according to the first embodiment of the present technology. In the drawing, dot lines indicate rays of continuous light and solid lines indicate rays of intermittent light.

As described above, the pixel density of the solid-state imaging element 130 is higher than the ToF sensor 200, and the solid-state imaging element 130 is provided near the ToF sensor 200. One pixel of the ToF sensor 200 measures an average distance to a surface (for example, a surface on an object about the ray 511) on an object within a certain angular range. The surface measured by one pixel is imaged by a plurality of pixels on the solid-state imaging element 130. For example, in a case where the ray 511 of reflected light reflected from a certain reflection position is incident on one pixel on the ToF sensor 200, rays 501, 502, 503, 504, and 505 of continuous light from the reflection position are incident on different pixels on the solid-state imaging element 130. Therefore, the distance measured by the ray 511 of intermittent light is an average value of each of the distances to the pixels corresponding to the continuous light 501, 502, 503, 504, and 505.

Figure 11:
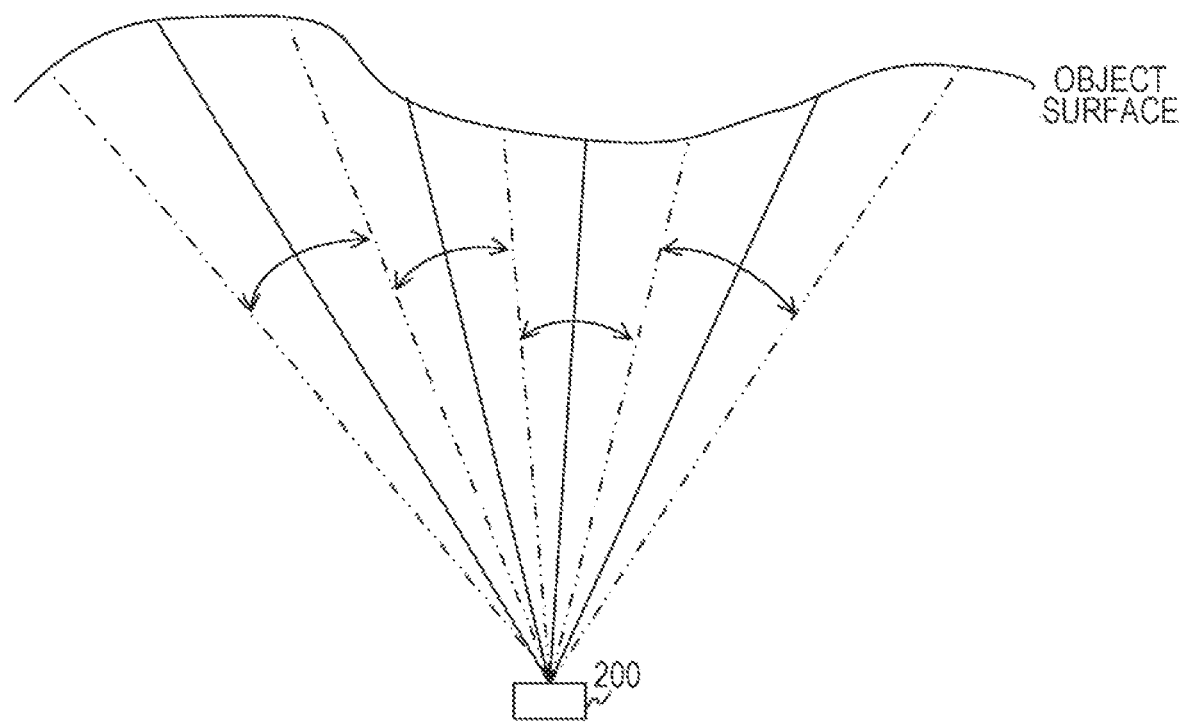
FIG. 11 is a diagram illustrating an example of a distance measurement range of each pixel of a ToF sensor according to the first embodiment of the present technology.

FIG. 11 is a diagram illustrating an example of a distance measurement range of each pixel of the ToF sensor 200 according to the first embodiment of the present technology. In the drawing, solid lines indicate rays of intermittent light. Moreover, arcs of which both ends are arrows indicate the range of intermittent light incident on one pixels on the ToF sensor 200. Intermittent light in a certain angular range about the solid line is incident on the one pixel of the ToF sensor 200. Further, the ToF sensor 200 measures an average distance to a surface on the object within the angular range for each pixel.

FIGS. 12A, 12B, 12C, and 12D are diagrams illustrating an example of distance data and luminance data for each pixel according to the first embodiment of the present technology. In the drawing, a is a diagram illustrating an example of the low-resolution distance data D(u)obs of each pixel. In a of the drawing, the vertical axis indicates the value of the distance data D(u)obs, and the horizontal axis indicates the pixel position u on the ToF sensor 200. At pixel positions u1, u2, u3, u4, and the like, the distance data D(u)obs is measured.

Figure 12A:
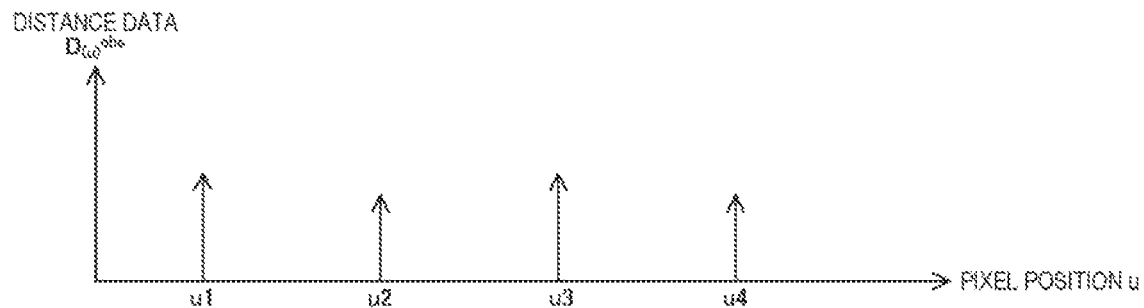
FIGS. 12A, 12B, 12C, and 12D is a are diagrams illustrating an example of distance data and luminance data of each pixel according to the first embodiment of the present technology.
Figure 12B:
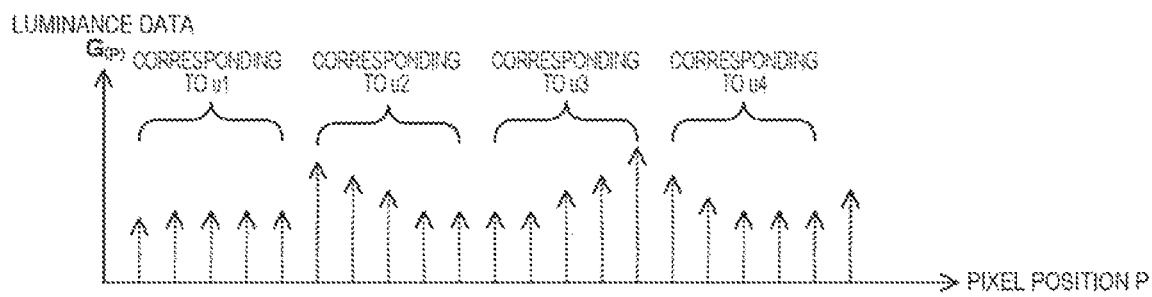

FIG. 12B is a diagram illustrating an example of the luminance data G(P) for each pixel. In FIG. 12B, the vertical axis indicates the value of luminance data G(P) and the horizontal axis indicates the pixel position P on the solid-state imaging element 130. A plurality of pieces of luminance data G(P) is correlated with each of the pixel positions u such as pixel positions u1 and u2.

Figure 12C:
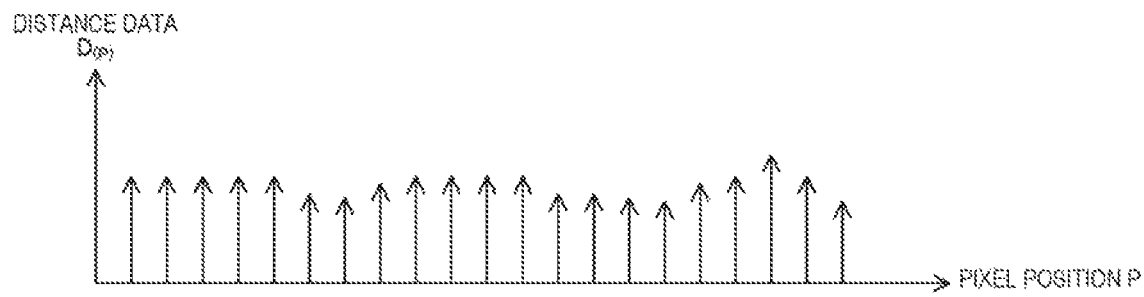

FIG. 12C is a diagram illustrating an example of high-resolution distance data D(p) for each pixel. In FIG. 12C, the vertical axis indicates the value of distance data D(P) and the horizontal axis indicates the pixel position P on the solid-state imaging element 130. The distance data is upsampled by the cross bilateral filter illustrated in Equations 13 and 14, and the distance data D(p) is calculated for each of the pixel positions P.

Figure 12D:
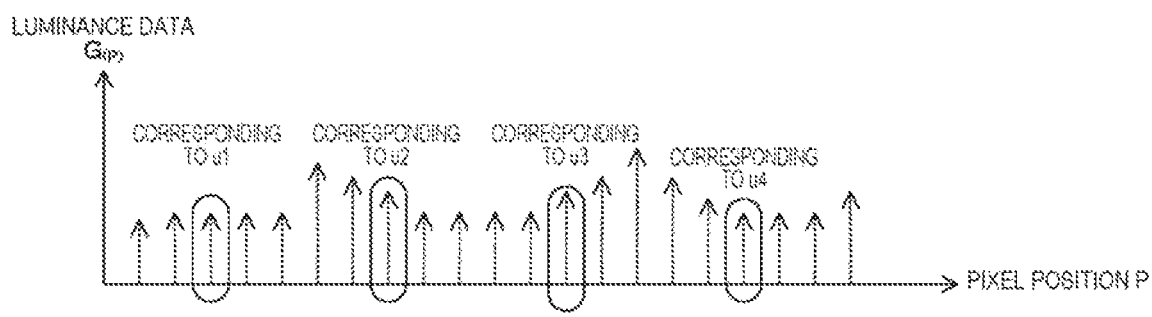

FIG. 12D is a diagram illustrating an example of luminance data according to a comparative example in which it is assumed that one pixel of the ToF sensor 200 is not a surface on an object having a certain area and the distance to a point on the object is measured in a pinpoint manner. In FIG. 12B, the vertical axis indicates the value of luminance data and the horizontal axis indicates the pixel position P on the solid-state imaging element. In this comparative example, unlike FIG. 12B, one piece of luminance data is correlated with each of pixels of the ToF sensor.

As described above, an actual pixel of the ToF sensor 200 has a certain size. Therefore, the positions of the object surface measured by the respective pixels of the ToF sensor 200 are not pin-points, but an average distance of a region having a certain area is measured. Therefore, in the comparative example of FIG. 12D, it is not possible to perform accurate upsampling. In contrast, in FIG. 12B, a plurality of pieces of luminance data related to a surface measured by each pixel is correlated with each of the pixels of the ToF sensor 200. Therefore, by calculating the average of these pieces of luminance data, the mobile terminal 100 can perform upsampling more accurately than the comparative example.

Figure 13:
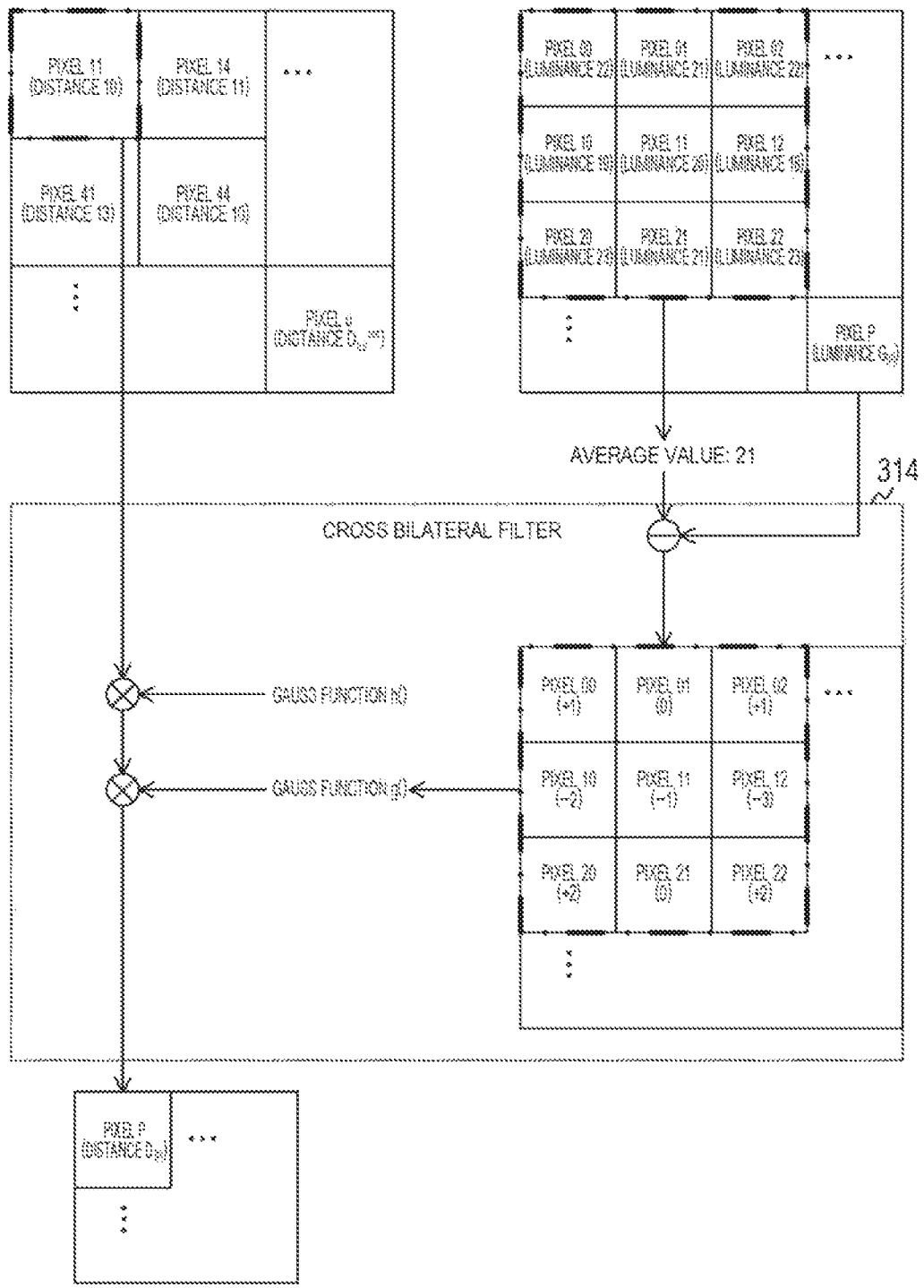
FIG. 13 is a diagram illustrating an example of filter processing according to the first embodiment of the present technology.

FIG. 13 is a diagram illustrating an example of filter processing according to the first embodiment of the present technology. The mobile terminal 100 generates the low-resolution distance data $D_{(u)}^{obs}$ for each pixel on the ToF sensor 200 and generates the luminance data $G_{(P)}$ for each of the pixels of the solid-state imaging element 130. The resolution of the ToF sensor 200 is lower than the solid-state imaging element 130 and a pixel block made up of a plurality of pixels on the solid-state imaging element 130 is correlated with one pixel of the ToF sensor 200. For example, a pixel 11 of the ToF sensor 200 is correlated with a pixel block made up of pixels 00, 01, 02, 10, 11, 12, 20, 21, and 22 on the solid-state imaging element 130.

The mobile terminal 100 calculates an average value of the luminance data for each pixel block. For example, in a case where the pieces of luminance data of the pixels 00, 01, 02, 10, 11, 12, 20, 21, and 22 are "22," "21," "22," "19," "20," "18," "23," "21," and "23," an average value of "21" is calculated.

In the cross bilateral filter 314, an absolute difference value between the luminance data of the pixel position P and the average value of the pixel blocks is input to the Gauss function g( ). Further, the Gauss function g( ) and the Gauss function h( ) are multiplied with the low-resolution distance data $G_{(u)}^{obs}$ and the distance data $D_{(p)}$ of each pixel position P is output.

[Operation Example of Mobile Terminal]

Figure 14:
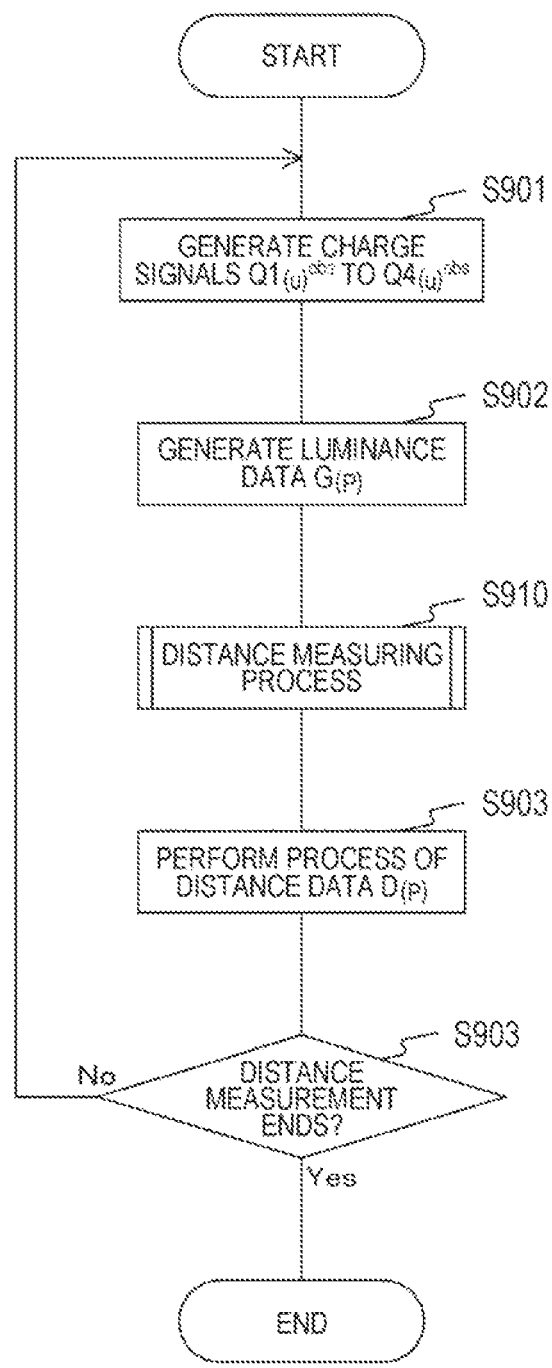
FIG. 14 is a flowchart illustrating an example of an operation of a mobile terminal according to the first embodiment of the present technology.

FIG. 14 is a flowchart illustrating an example of an operation of the mobile terminal according to the first embodiment of the present technology. This operation starts when an application which uses a depth map is executed, for example. The ToF sensor 200 generates the charge signals $Q1_{(u)}^{obs}$ to $Q4_{(u)}^{obs}$ for each pixel (step S901). Moreover, the solid-state imaging element 130 generates the luminance data $G_{(P)}$ for each pixel (step S902).

Further, the distance measuring unit 300 executes a distance measuring process for generating a high-resolution depth map (step S910). The distance data processing unit 140 processes the distance data $D_{(P)}$ in the depth map (step S903).

The mobile terminal 100 determines whether or not to end a distance measuring process by terminating an application or the like (step S903). In a case where a distance measuring process is not ended (step S903: No), the mobile terminal 100 executes processes of step S901 and the subsequent steps repeatedly. On the other hand, in a case where a distance measuring process is ended (step S903: Yes), the mobile terminal 100 ends an operation for generating the depth map.

Figure 15:
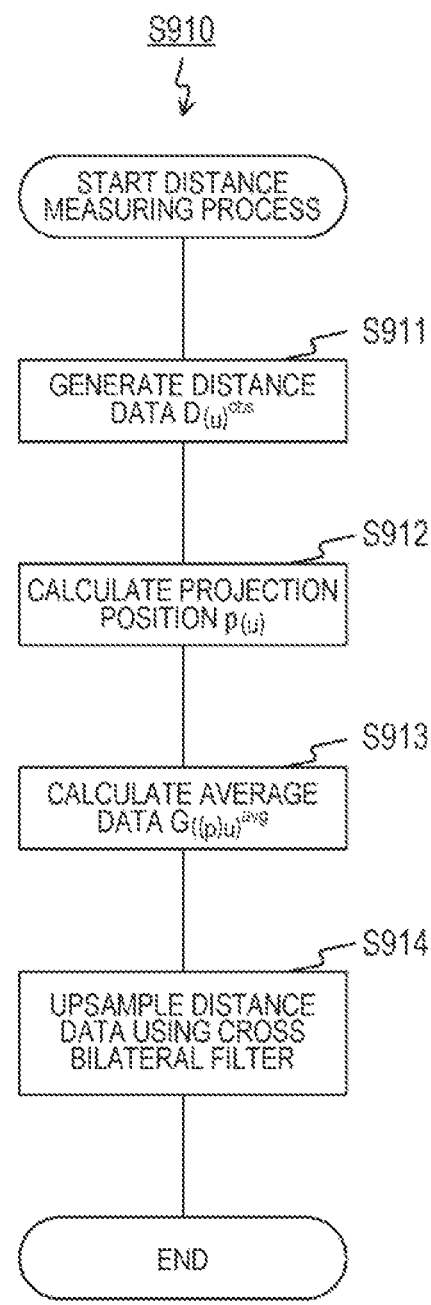
FIG. 15 is a flowchart illustrating an example of a distance measuring process according to the first embodiment of the present technology.

FIG. 15 is a flowchart illustrating an example of a distance measuring process according to the first embodiment of the present technology. The distance measuring unit 300 generates the low-resolution distance data $D_{(u)}^{obs}$ from the charge signals $Q1_{(u)}^{obs}$ to $Q4_{(u)}^{obs}$ (step S911) and calculates the projection position $p_{(u)}$ for each of the pixel positions u (step S912). Moreover, the distance measuring unit 300 calculates the average data $G_{(p(u))}^{avg}$ for each of the pixel blocks (step S913). Further, the distance measuring unit 300 upsamples the distance data $D_{(u)}^{obs}$ using the cross bilateral filter (step S914). After step S914 is executed, the distance measuring unit 300 ends the distance measuring process.

As described above, according to the first embodiment of the present technology, since the average data of the luminance in a pixel block is input to a filter together with low-resolution distance data, the high-resolution distance data can be calculated using the average data as a reference value. In this way, it is possible to perform upsampling accurately.

2. Second Embodiment

In the first embodiment, although the distance data is upsampled, instead of this, the difference data in Equations 7 and 8 may be upsampled. The mobile terminal 100 of the second embodiment is different from that of the first embodiment in that the difference data is upsampled.

Figure 16:
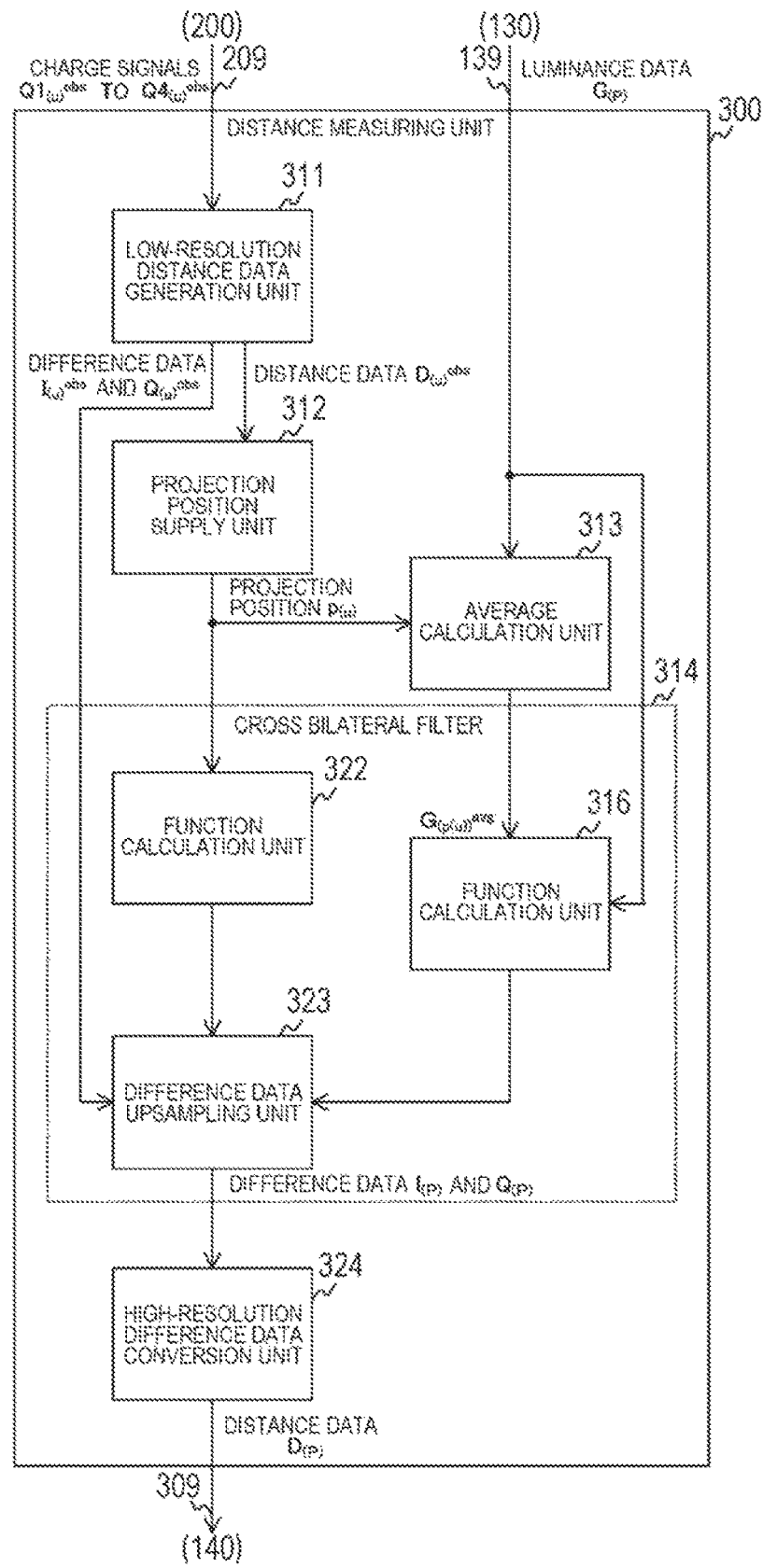
FIG. 16 is a block diagram illustrating a configuration example of a distance measuring unit according to a second embodiment of the present technology.

FIG. 16 is a block diagram illustrating a configuration example of a distance measuring unit 300 according to the second embodiment of the present technology. The distance measuring unit 300 of the second embodiment is different from that of the first embodiment in that the distance measuring unit 300 includes a difference data upsampling unit 323 instead of the distance data upsampling unit 317 and further includes a high-resolution difference data conversion unit 324.

The low-resolution distance data generation unit 311 of the second embodiment further generates difference data $I_{(u)}^{obs}$ and $Q_{(u)}^{obs}$ in addition to the low-resolution distance data $D_{(u)}^{obs}$ for each pixel and supplies the same to the cross bilateral filter 314.

The difference data upsampling unit 323 upsamples the difference data $I_{(u)}^{obs}$ and $Q_{(u)}^{obs}$ by the following equations.

[Math. 15]
$$I_{(P)} = \frac{1}{k_{(P)}} \sum_{\{u|p(u)\in\Omega_P\}} \{I_{(u)}^{obs} \times h(\|P - p_{(u)}\|) \times g(\|G_{(P)} - G_{(p(u))}^{avg}\|)\} \quad \text{Equation 15}$$

[Math. 16]
$$Q_{(P)} = \frac{1}{k_{(P)}} \sum_{\{u|p(u)\in\Omega_P\}} \{Q_{(u)}^{obs} \times h(\|P - p_{(u)}\|) \times g(\|G_{(P)} - G_{(p(u))}^{avg}\|)\} \quad \text{Equation 16}$$

The difference data upsampling unit 323 supplies the difference data $I_{(P)}$ and $Q_{(P)}$ calculated by Equations 15 and 16 to the high-resolution difference data conversion unit 324 as high-resolution difference data.

The high-resolution difference data conversion unit 324 converts the high-resolution difference data $I_{(P)}$ and $Q_{(P)}$ to the high-resolution distance data $D_{(P)}$ according to the following equation and outputs the high-resolution distance data $D_{(P)}$ to the distance data processing unit 140.

[Math. 17]
$$D_{(P)} = \frac{c}{4\pi f} \cdot \arctan\left(\frac{Q_{(P)}}{I_{(P)}}\right) \quad \text{Equation 17}$$

Figure 17:
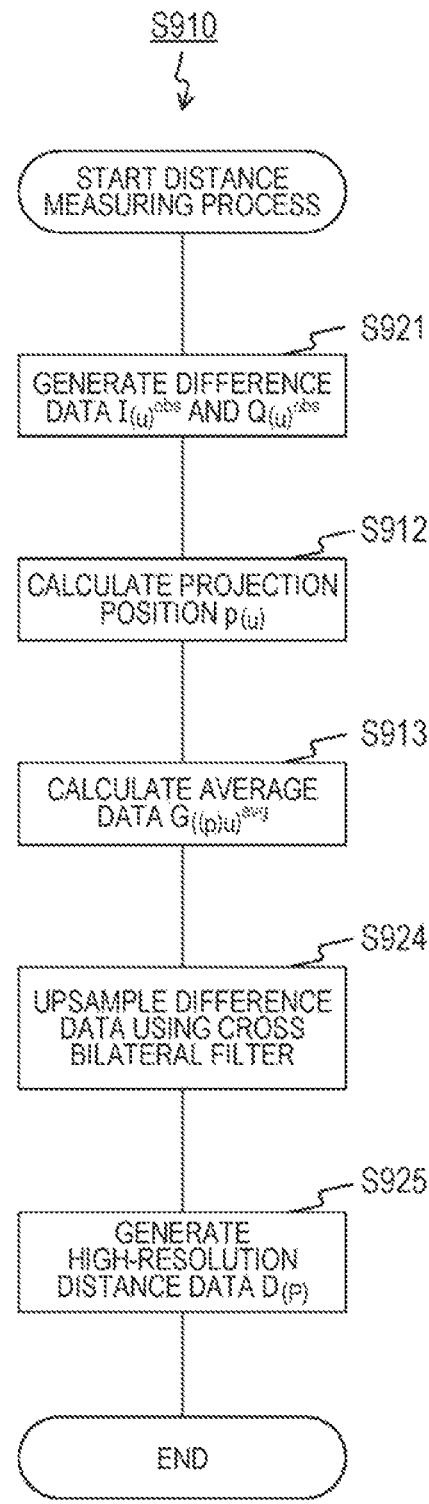
FIG. 17 is a flowchart illustrating an example of a distance measuring process according to the second embodiment of the present technology.

FIG. 17 is a flowchart illustrating an example of a distance measuring process according to the second embodiment of the present technology. The distance measuring process of the second embodiment is different from that of the first embodiment in that steps S921 and S924 are executed instead of steps S911 and S914 and step S925 is executed further.

The distance measuring unit 300 generates difference data $I_{(u)}^{obs}$ and $Q_{(u)}^{obs}$ for each pixel position u (step S921) and executes steps S912 and S913. Further, the distance measuring unit 300 upsamples the difference data $I_{(u)}^{obs}$ and $Q_{(u)}^{obs}$ using the cross bilateral filter (step S924). The distance measuring unit 300 converts the upsampled difference data to the high-resolution distance data $D_{(P)}$ (step S925) and ends the distance measuring process.

Incidentally, although the solid-state imaging element 130 of the first and second embodiments generates monochrome image data, the solid-state imaging element 130 may generate color image data instead of the monochrome image data. In this case, for example, the luminance data $G_{(P)}$ and the average data $G_{(p(u))}^{avg}$ in Equations 12 to 16 of the cross bilateral filter are a 3-dimensional vector of red (R), green (G), and blue (B). Moreover, in Equations 13 to 16, the value input to the Gauss function g ( ) is the distance between two points on the 3-dimensional vector of R, G, and B.

As described above, in the second embodiment of the present technology, since the average data of the luminance in a pixel block is input to a filter together with low-resolution difference data, it is possible to calculate high-resolution difference data using the average data as a reference value. In this way, it is possible to perform upsampling accurately.

3. Third Embodiment

In the first embodiment, the mobile terminal 100 upsamples the distance data using the cross bilateral filter 314. However, the mobile terminal 100 may upsample the distance data without using the cross bilateral filter 314. For example, the mobile terminal 100 may calculate a function indicating a relation between distance data and average data by regression analysis and may upsample the distance data using the function. The mobile terminal 100 of the third embodiment is different from that of the first embodiment in that the mobile terminal 100 upsamples the distance data using a function calculated by regression analysis.

Figure 18:
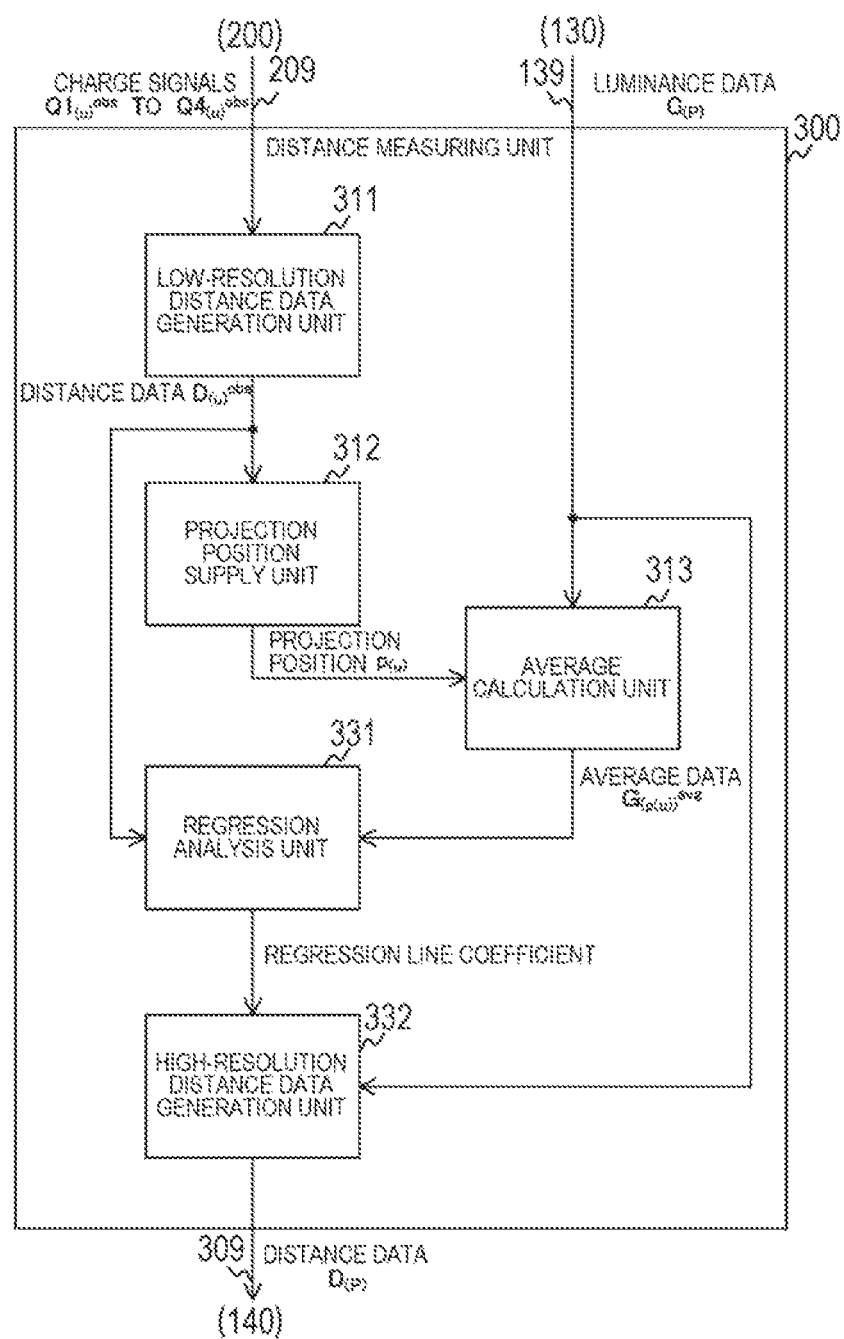
FIG. 18 is a block diagram illustrating a configuration example of a distance measuring unit according to a third embodiment of the present technology.

FIG. 18 is a block diagram illustrating a configuration example of the distance measuring unit 300 according to the third embodiment of the present technology. The distance measuring unit 300 of the third embodiment is different from that of the first embodiment in that the distance measuring unit 300 includes a regression analysis unit 331 and a high-resolution distance data generation unit 332 instead of the cross bilateral filter 314.

The regression analysis unit 331 calculates a function f( ) indicating the relation between the distance data D and the luminance data G by regression analysis. This function f( ) is represented by the following equation, for example.

$$D=f(G)=a \times G+b \qquad \text{Equation 18}$$

In this equation, a and b are coefficients of real numbers.

The regression analysis unit 331 performs regression analysis using the least-squares method that calculates the coefficients a and b which minimize the sum of squares of the difference between the low-resolution distance data $D_{(u)}^{obs}$ and the result of Equation 18 in which the average data $G_{(p(u))}^{avg}$ of luminance data is input, for example. Further, the regression analysis unit 331 supplies the calculated coefficients a and b to the high-resolution distance data generation unit 332 as regression line coefficients.

The high-resolution distance data generation unit 332 inputs the luminance data $G_{(P)}$ of the respective pixel positions P to Equation 18 to generate high-resolution distance data $D_{(P)}$ and outputs the same to the distance data processing unit 140.

Figure 19:
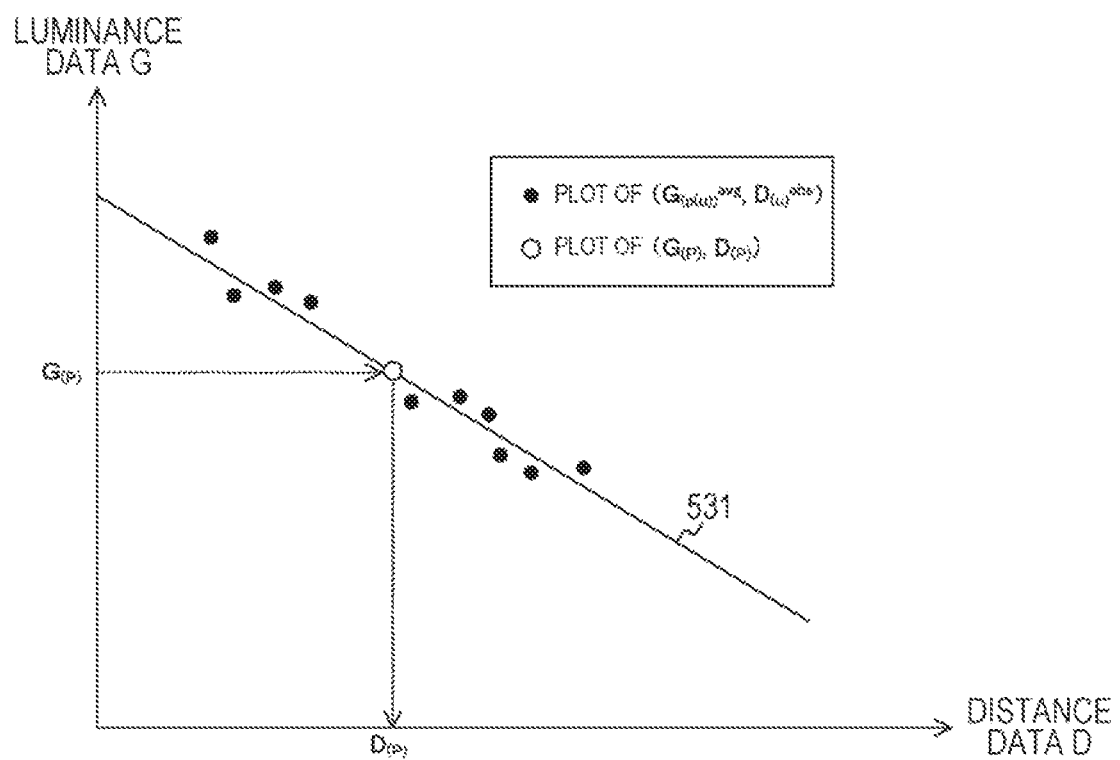
FIG. 19 is a graph showing an example of a relation between luminance data and distance data according to the third embodiment of the present technology.

FIG. 19 is a graph showing an example of the relation between the luminance data and the distance data according to the third embodiment of the present technology. In the drawing, the vertical axis is luminance data G and the horizontal axis is distance data D. Moreover, black circles plot combinations of corresponding low-resolution distance data $D_{(u)}^{obs}$ and average data $G_{(p(u))}^{avg}$. White circles plot a set of distance data $D_{(P)}$ at the pixel position P of the high-resolution solid-state imaging element 130 and the corresponding high-resolution luminance data $G_{(P)}$. Moreover, a regression line 531 is a line represented by Equation 18.

The regression analysis unit 331 plots a combination of distance data $D_{(u)}^{obs}$ and average data $G_{(p(u))}^{avg}$ on a 2-dimensional space with respect to u at which $p_{(u)}$ is near a focusing pixel position P on the solid-state imaging element 130. Moreover, the regression analysis unit 331 performs regression analysis with respect to a set of plotted black circles to calculate the regression line 531. The high-resolution distance data generation unit 332 calculates the distance data corresponding to the luminance data $G_{(P)}$ on the calculated regression line 531 as high-resolution distance data $D_{(P)}$.

Figure 20:
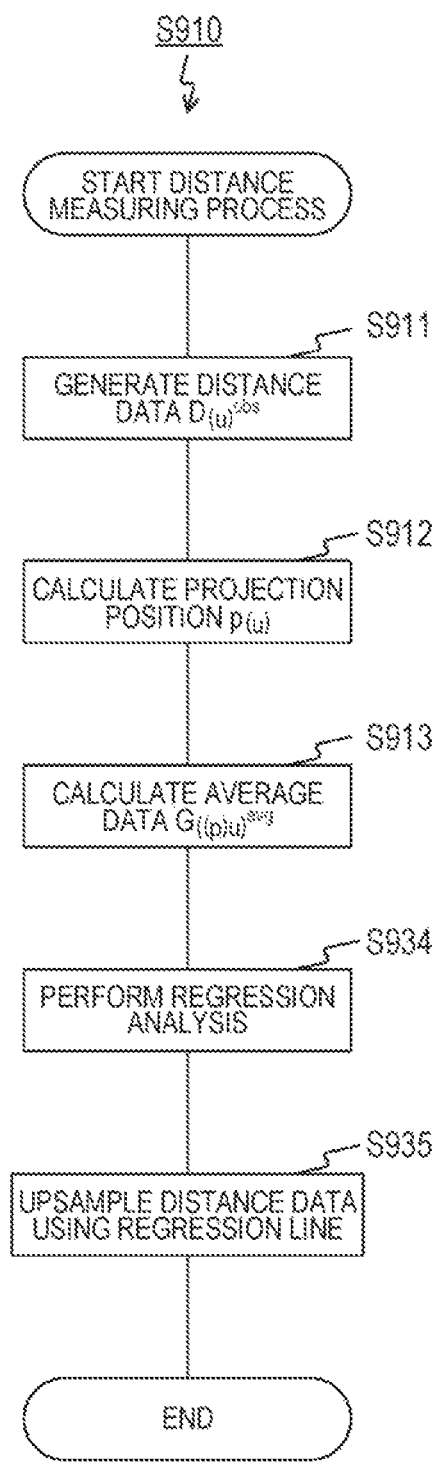
FIG. 20 is a flowchart illustrating an example of a distance measuring process according to the third embodiment of the present technology.

FIG. 20 is a flowchart illustrating an example of a distance measuring process according to the third embodiment of the present technology. The distance measuring process of the third embodiment is different from that of the first embodiment in that steps S934 and S935 are executed instead of step S914.

After executing steps S911 to S913, the distance measuring unit 300 performs regression analysis with respect to the low-resolution distance data $D_{(u)}^{obs}$ and average data $G_{(p(u))}^{avg}$ to calculate a regression line (step S934). Further, the high-resolution distance data generation unit 332 upsamples the distance data using the regression line (step S935) and ends the distance measuring process.

As described above, in the third embodiment of the present technology, since the mobile terminal 100 performs regression analysis on the average data and the low-resolution distance data to calculate a function indicating the relation therebetween, it is possible to upsample the distance data with high accuracy using the function.

4. Fourth Embodiment

In the third embodiment, although the distance data is upsampled using a regression line, the difference data in Equations 7 and 8 may be upsampled. The mobile terminal 100 of the fourth embodiment is different from that of the third embodiment in that difference data is upsampled using a regression line.

Figure 21:
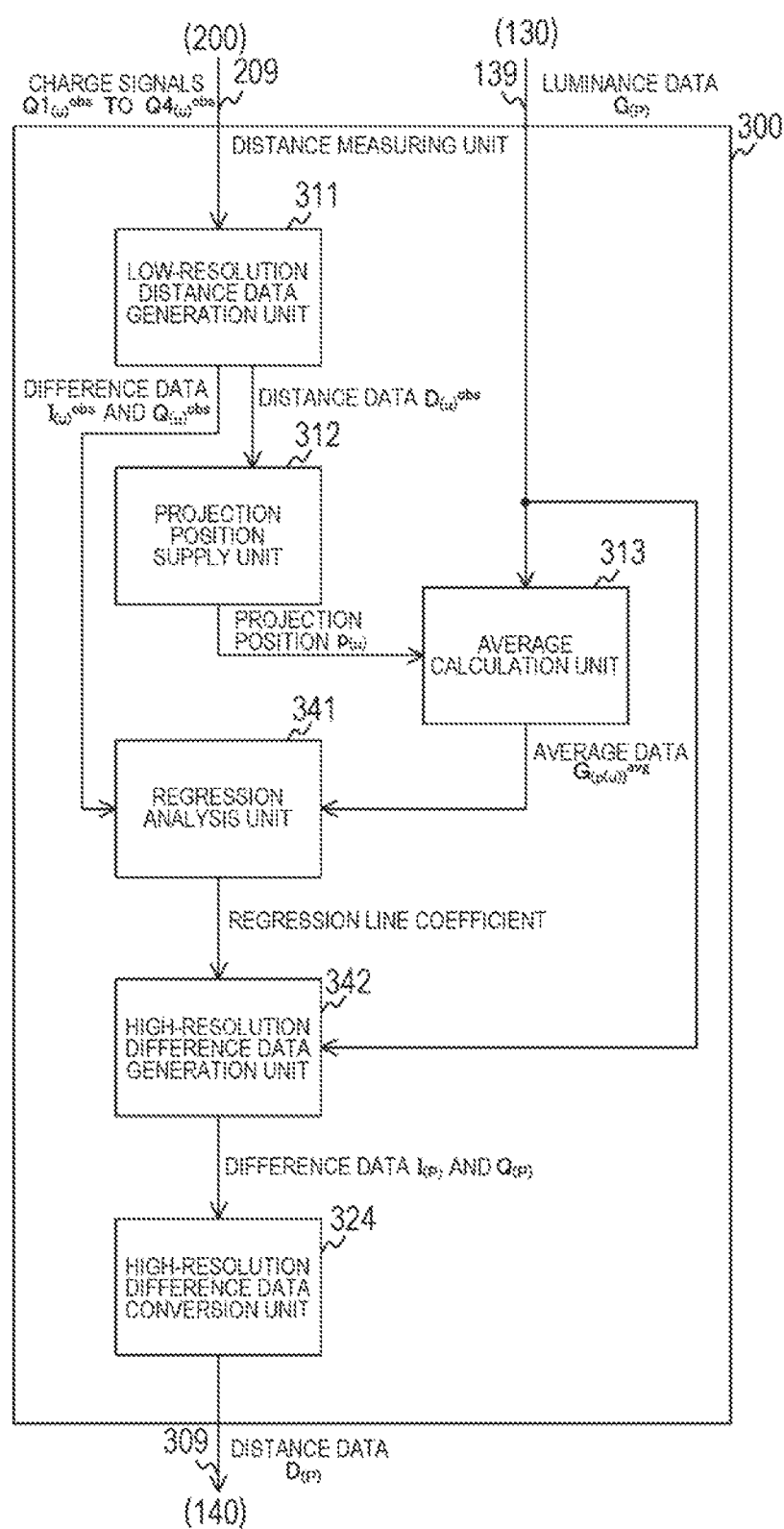
FIG. 21 is a block diagram illustrating a configuration example of a distance measuring unit according to a fourth embodiment of the present technology.

FIG. 21 is a block diagram illustrating a configuration example of the distance measuring unit 300 according to the fourth embodiment of the present technology. The distance measuring unit 300 of the fourth embodiment is different from that of the third embodiment in that the distance measuring unit 300 includes a regression analysis unit 341 and a high-resolution difference data generation unit 342 instead of the regression analysis unit 331 and the high-resolution distance data generation unit 332 and further includes a high-resolution difference data conversion unit 324. The configuration of the high-resolution difference data conversion unit 324 is similar to that of the second embodiment.

The low-resolution distance data generation unit 311 of the fourth embodiment generates difference data $I_{(u)}^{obs}$ and $Q_{(u)}^{obs}$ in addition to the low-resolution distance data $D_{(u)}^{obs}$ or each pixel and supplies the same to the regression analysis unit 341.

The regression analysis unit 341 calculates a function indicating a relation between the difference data I and Q and the luminance data G according to regression analysis. This function is represented by the following equation, for example.

$$(I-I_0)/c=(Q-Q_0)/d=(G-G_0)/e \qquad \text{Equation 19}$$

In this equation, c, d, e, $I_0$, $Q_0$, and $G_0$ are coefficients of real numbers.

Further, the regression analysis unit 341 supplies the calculated coefficients c, d, e, $I_0$, $Q_0$, and $G_0$ to the high-resolution difference data generation unit 342 as regression line coefficients.

The high-resolution difference data generation unit 342 inputs the luminance data $G_{(P)}$ of each of the pixel positions P to Equation 19 to generate the high-resolution difference data $I_{(p)}$ and $Q_{(P)}$ and outputs the same to the high-resolution difference data conversion unit 324.

Figure 22:
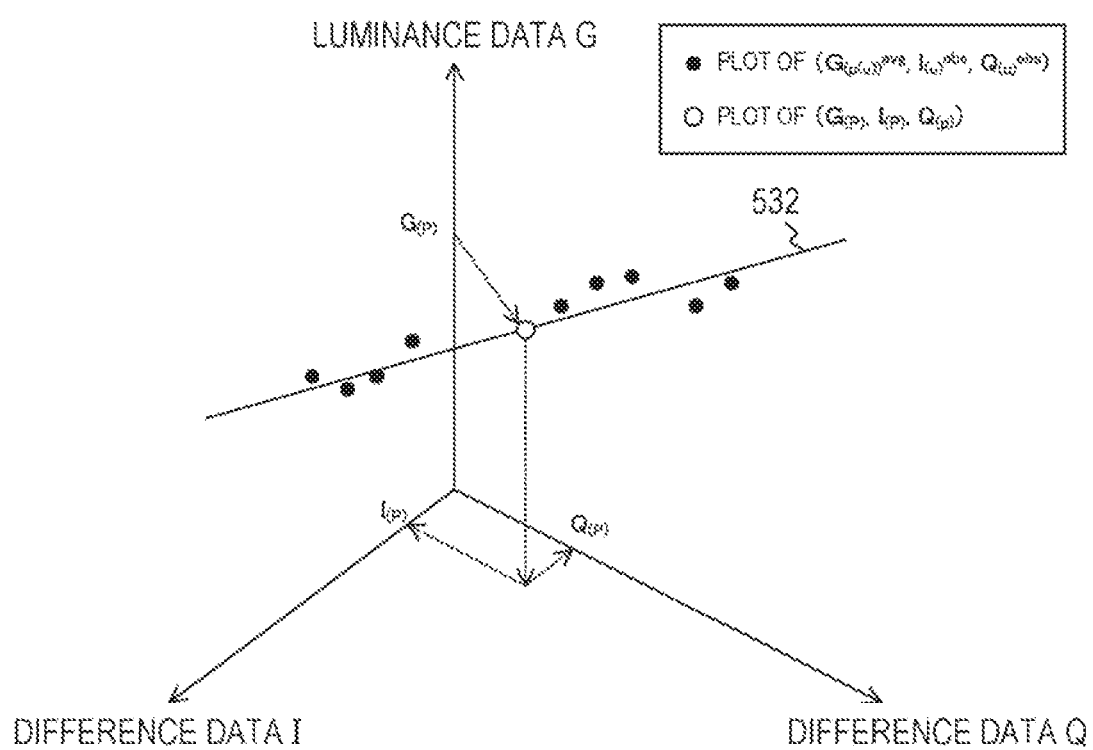
FIG. 22 is a graph showing an example of a relation between luminance data and difference data according to the fourth embodiment of the present technology.

FIG. 22 is a graph showing an example of the relation between the luminance data and the difference data according to the fourth embodiment of the present technology. In the drawing, one of orthogonal three axes indicates the luminance data G, and the remaining two axes indicate difference data I and Q. Moreover, black circles plot respective combinations of the low-resolution difference data $I_{(u)}^{obs}$ and $Q_{(u)}^{obs}$ and the average data $G_{(p(u))}^{avg}$. White circles plot a set of the luminance data $G_{(P)}$ at the pixel position P of the solid-state imaging element 130 and the corresponding high-resolution difference data $I_{(P)}$ and $Q_{(P)}$. Moreover, a regression line 532 is a line represented by Equation 19.

The regression analysis unit 341 plots a combination of difference data $I_{(u)}^{obs}$ and $Q_{(u)}^{obs}$ and average data $G_{(p(u))}^{avg}$ on a 3-dimensional space with respect to u at which $p_{(u)}$ is near a focusing pixel position P on the solid-state imaging element 130. Moreover, the regression analysis unit 341 performs regression analysis with respect to a set of plotted black circles to calculate the regression line 532. The high-resolution difference data generation unit 342 calculates difference data corresponding to the luminance data $G_{(P)}$ on the calculated regression line 532 as high-resolution distance data $I_{(P)}$ and $Q_{(P)}$.

Figure 23:
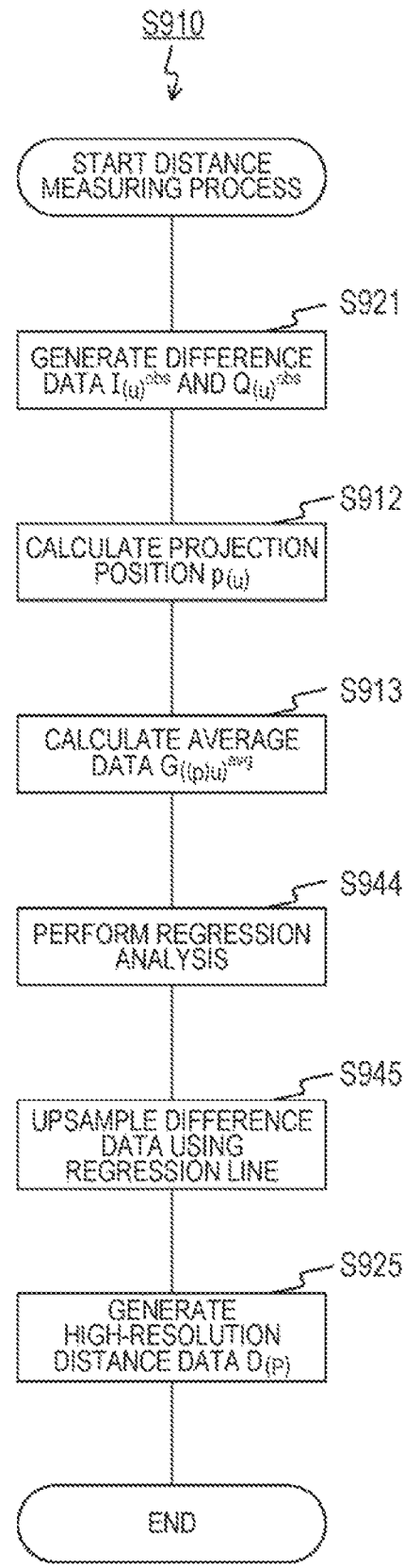
FIG. 23 is a flowchart illustrating an example of a distance measuring process according to the fourth embodiment of the present technology.

FIG. 23 is a flowchart illustrating an example of a distance measuring process according to the fourth embodiment of the present technology. The distance measuring process of the fourth embodiment is different from that of the third embodiment in that step S921 is executed instead of step S911, steps S944 and S945 are executed instead of steps S934 and S935, and step S925 is executed further.

The distance measuring unit 300 generates difference data $I_{(u)}^{obs}$ and $Q_{(u)}^{obs}$ for each pixel (step S921) and executes steps S912 and S913. The distance measuring unit 300 performs regression analysis on the low-resolution difference data $I_{(u)}^{obs}$ and $Q_{(u)}^{obs}$ and the average data $G_{(p(u))}^{avg}$ to calculate a regression line (step S944). Further, the high-resolution distance data generation unit 332 upsamples the difference data according to the regression line (step S945). The distance measuring unit 300 converts the upsampled difference data to the high-resolution distance data D(p) (step S925) and ends the distance measuring process.

As described above, in the fourth embodiment of the present technology, since the mobile terminal 100 performs regression analysis on the average data and the low-resolution difference data to calculate a function indicating the relation therebetween, it is possible to upsample the difference data with high accuracy using the function.

5. Fifth Embodiment

In the first embodiment, the mobile terminal 100 upsamples the distance data using the cross bilateral filter 314. However, the mobile terminal 100 may upsample the distance data without using the cross bilateral filter 314. For example, the mobile terminal 100 may upsample the distance data using energy minimization calculation. The mobile terminal 100 of the fifth embodiment is different from that of the first embodiment in that distance data is upsampled by energy minimization calculation.

Figure 24:
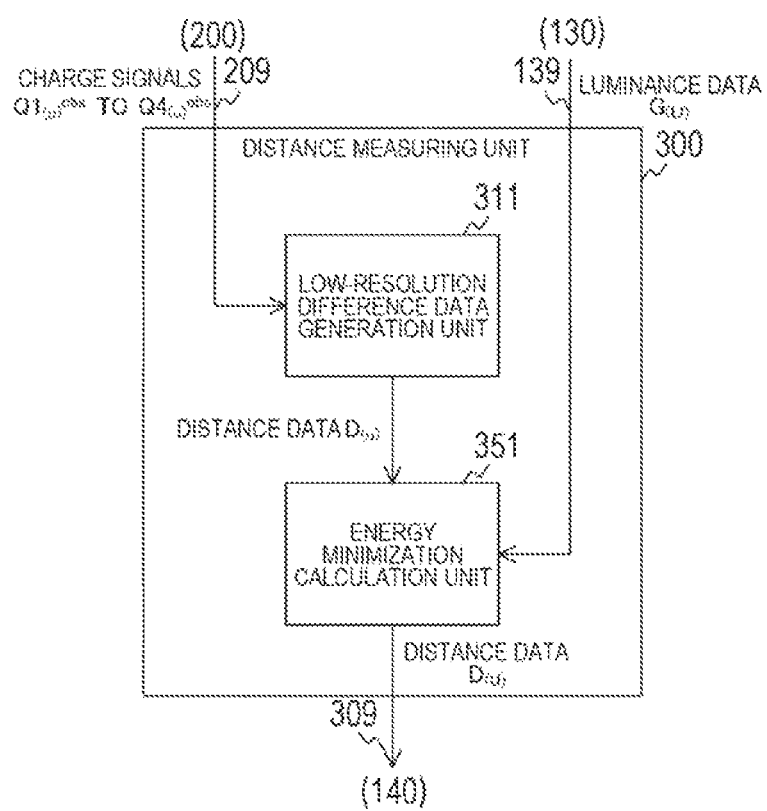
FIG. 24 is a block diagram illustrating a configuration example of a distance measuring unit according to a fifth embodiment of the present technology.

FIG. 24 is a block diagram illustrating a configuration example of the distance measuring unit 300 according to the fifth embodiment of the present technology. The distance measuring unit 300 of the fifth embodiment is different from that of the first embodiment in that the distance measuring unit 300 includes an energy minimization calculation unit 351 instead of the projection position supply unit 312, the average calculation unit 313, and the cross bilateral filter 314.

The energy minimization calculation unit 351 generates high-resolution distance data by energy minimization calculation that minimizes the difference between the low-resolution distance data and an average value of the high-resolution distance data for each pixel block. The energy minimization calculation unit 351 calculates high-resolution distance data $D_{(U)}$ that satisfies the following equations.

[Math. 18]
$$\{D_{(U)} \mid U \in H\} = \underset{\{D'_{(U)} \mid U \in H\}}{\mathrm{argmin}} \, (dTerm + A \times sTerm) \quad \text{Equation 20}$$

[Math. 19]
$$dTerm \equiv \sum_{u \in L} \left\{ \left( \frac{\sum_{V \in \Omega u \cap H} D'_{(V)}}{N} - D_{(u)}^{obs} \right)^2 \right\} \quad \text{Equation 21}$$

[Math. 20]
$$sTerm \equiv \sum_{U \in H} \left\{ \left\| T_{(U)}^{\frac{1}{2}} \nabla D'_{(U)} \right\| \right\} \quad \text{Equation 22}$$

[Math. 21]
$$T_{(U)}^{\frac{1}{2}} \equiv \exp(-B \|\nabla G_{(U)}\|^r) n_{(U)} n_{(U)}^t + m_{(U)} m_{(U)}^t \quad \text{Equation 23}$$

The first term on the right side of Equation 20 is a data term and the second term is a smooth term. In Equation 21, the set $\Omega$, with the subscript u is a set of pixel positions in a square region of which the length of one side is one about the pixel position u on the ToF sensor 200. In Equation 23, $n_{(u)}$ is a unit vector indicating the direction of gradient at the pixel position u, and $m_{(u)}$ is a unit vector orthogonal to $n_{(u)}$. Moreover, in Equations 22 and 23, a function $T^{1/2}$ is anisotropic diffusion tensor. The anisotropic diffusion tensor is described in "D. Ferstl, Image Guided Depth Upsampling Using Anisotropic Total Generalized Variation, ICCV 2013." In Equations 20 and 23, A, B, and r are desired constants.

In Equation 23, $G_{(u)}$ is luminance data at a position represented by the following equation on the monochrome image sensor 200.

[Math. 22]
$$\begin{bmatrix} \dfrac{F_c \cdot X'_{(U)}}{Z'_{(U)}} \\ \dfrac{F_c \cdot Y'_{(U)}}{Z'_{(U)}} \end{bmatrix} \quad \text{Equation 24}$$

In Equation 24, coordinates $X'_{(u)}$, $Y'_{(u)}$, and $Z'_{(u)}$ are represented by the following equation.

[Math. 23]
$$\begin{bmatrix} X'_{(U)} \\ Y'_{(U)} \\ Z'_{(U)} \end{bmatrix} \equiv \frac{D'_{(U)}}{\sqrt{U_X^2 + U_Y^2 + F_t^2}} R \begin{bmatrix} U_X \\ U_Y \\ F_t \end{bmatrix} + T \quad \text{Equation 25}$$

A data term dTerm in Equation 20 indicates the sum of squares of the difference between the low-resolution distance data $D_{(u)}^{obs}$ and the average value of the high-resolution distance data $D_{(u)}$ in a corresponding pixel block as illustrated in Equation 21. The energy minimization calculation unit 351 supplies the high-resolution distance data $D_{(u)}$ that minimizes the data term to the distance data processing unit 140. That is, the high-resolution distance data $D_{(u)}$ that minimizes the difference between the low-resolution distance data $D_{(u)}^{obs}$ and the average value of the high-resolution distance data $D_{(u)}$ in the corresponding pixel block is calculated. Moreover, with the smooth term sTerm in Equation 22, in a case where there is no step in the luminance data Gm at the position on the solid-state imaging element 130 corresponding to each of the positions u on the ToF sensor 200, the distance data $D_{(u)}$ is similarly calculated so as to be smooth as much as possible.

As described above, similarly to the first to fourth embodiments, in the fifth embodiment, calculation is performed assuming that the low-resolution distance data $G_{(u)}^{obs}$ indicates an average of each of the distances of a plurality of pixels in the corresponding pixel block.

Figure 25:
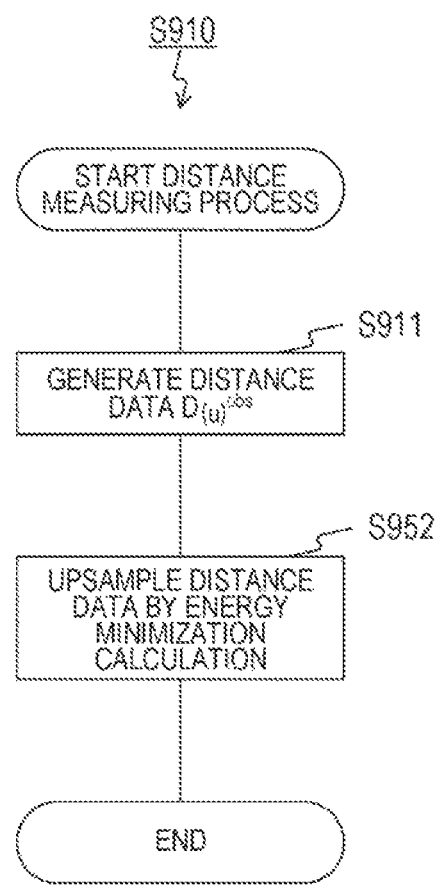
FIG. 25 is a flowchart illustrating an example of a distance measuring process according to the fifth embodiment of the present technology.

FIG. 25 is a flowchart illustrating an example of a distance measuring process according to the fifth embodiment of the present technology. The distance measuring process of the fifth embodiment is different from that of the first embodiment in that step S952 is executed instead of steps S912 to S914.

The distance measuring unit 300 generates low-resolution distance data $D_{(u)}^{obs}$ from charge signals $Q1_{(u)}^{obs}$ to $Q4_{(u)}^{obs}$ (step S911). Further, the distance measuring unit 300 upsamples the distance data by energy minimization calculation (step S952).

As described above, in the fifth embodiment of the present technology, since energy minimization calculation that minimizes the difference between the low-resolution distance data and the average value of the high-resolution distance data for each pixel block is performed, it is possible to upsample the distance data without using a filter.

6. Sixth Embodiment

In the fifth embodiment, although distance data is upsampled, the difference data in Equations 7 and 8 may be upsampled. The mobile terminal 100 of the sixth embodiment is different from that of the fifth embodiment in that difference data is upsampled.

Figure 26:
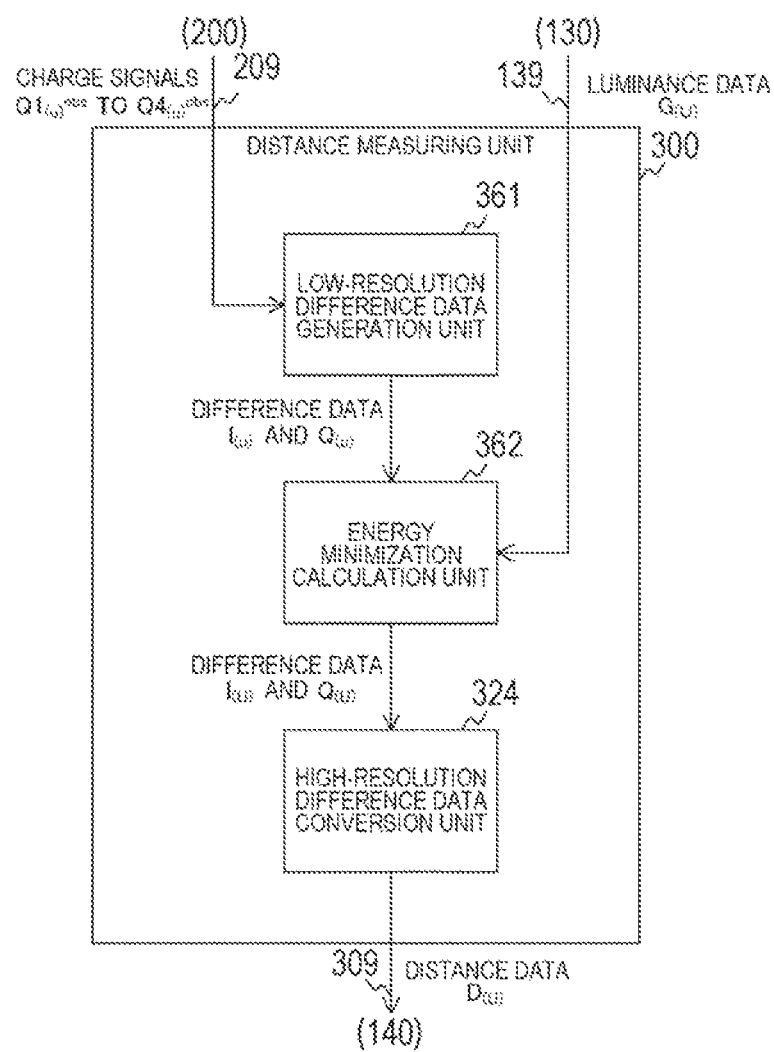
FIG. 26 is a block diagram illustrating a configuration example of a distance measuring unit according to a sixth embodiment of the present technology.

FIG. 26 is a block diagram illustrating a configuration example of the distance measuring unit 300 according to the sixth embodiment of the present technology. The distance measuring unit 300 of the sixth embodiment is different from that of the fifth embodiment in that the distance measuring unit 300 includes a low-resolution difference data generation unit 361 instead of the low-resolution distance data generation unit 311. Moreover, the distance measuring unit 300 of the sixth embodiment is different from that of the fifth embodiment in that the distance measuring unit 300 includes an energy minimization calculation unit 362 instead of the energy minimization calculation unit 351 and further includes a high-resolution difference data conversion unit 324. The configuration of the high-resolution difference data conversion unit 324 is similar to the second embodiment.

The low-resolution difference data generation unit 361 generates the difference data $I_{(u)}^{obs}$ and $Q_{(u)}^{obs}$ for each pixel according to Equations 8 and 9 and supplies the same to the energy minimization calculation unit 362.

The energy minimization calculation unit 362 generates high-resolution difference data by energy minimization calculation that minimizes the difference between the low-resolution difference data and the average value of the high-resolution difference data for each pixel block. The energy minimization calculation unit 362 calculates high-resolution difference data $I_{(U)}$ and $Q_{(u)}$ that satisfy the following equations.

[Math. 24]
$$\{(I_{(U)}, Q_{(U)}) \mid U \in H\} = \operatorname*{argmin}_{\{(I'_{(U)}, Q'_{(U)}) \mid U \in H\}} (dTerm + A \times sTerm) \quad \text{Equation 26}$$

[Math. 25]
$$dTerm \equiv \sum_{U \in L} \left\{ \left( \frac{\sum_{V \in \Omega u \cap H} I'_{(V)}}{N} - I_{(u)}^{obs} \right)^2 + \left( \frac{\sum_{V \in \Omega u \cap H} Q'_{(V)}}{N} - Q_{(u)}^{obs} \right)^2 \right\} \quad \text{Equation 27}$$

[Math. 26]
$$sTerm \equiv \sum_{U \in H} \left\{ \left\| T_{(U)}^{\frac{1}{2}} \nabla I'_{(U)} \right\| + \left\| T_{(U)}^{\frac{1}{2}} \nabla Q'_{(U)} \right\| \right\} \quad \text{Equation 28}$$

[Math. 27]
$$T_{(U)}^{\frac{1}{2}} \equiv \exp(-B \|\nabla G_{(U)}\|^r) n_{(U)} n_{(U)}^t + m_{(U)} m_{(U)}^t \quad \text{Equation 29}$$

Here, the pixel position U is represented by Equations 24 and 25 and the following equation.

[Math. 28]
$$D'_{(U)} \equiv \frac{c}{4\pi f} \cdot \arctan\left( \frac{Q'_{(U)}}{I'_{(U)}} \right) \quad \text{Equation 30}$$

By Equations 26 to 29, the high-resolution difference data $I_{(U)}$ and $Q_{(U)}$ that minimize the difference between the low-resolution difference data $I_{(u)}^{obs}$ and $Q_{(u)}^{obs}$ and the average value of the high-resolution difference data $I_{(U)}$ and $Q_{(U)}$ in the corresponding pixel block are calculated.

The high-resolution difference data conversion unit 324 calculates the high-resolution distance data $D_{(U)}$ using the following equation and supplies the same to the distance data processing unit 140.

[Math. 29]
$$D_{(U)} = \frac{c}{4\pi f} \cdot \arctan\left( \frac{Q_{(U)}}{I_{(U)}} \right) \quad \text{Equation 31}$$

Figure 27:
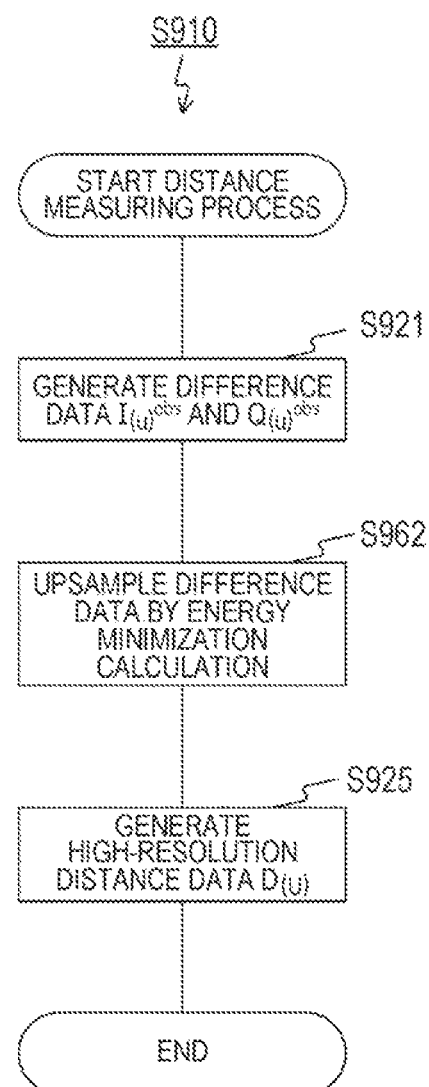
FIG. 27 is a flowchart illustrating an example of a distance measuring process according to the sixth embodiment of the present technology.

FIG. 27 is a flowchart illustrating an example of a distance measuring process according to the sixth embodiment of the present technology. The distance measuring process of the sixth embodiment is different from that of the fifth embodiment in that step S921 is executed instead of step S911, step S962 is executed instead of step S952, and step S925 is executed further.

The distance measuring unit 300 generates difference data $I_{(u)}^{obs}$ and $Q_{(u)}^{obs}$ for each pixel position u (step S921) and upsamples the difference data by energy minimization calculation (step S962). Further, the distance measuring unit 300 converts the upsampled difference data to the high-resolution distance data $D_{(P)}$ (step S925) and ends the distance measuring process.

As described above, in the sixth embodiment of the present technology, since energy minimization calculation that minimizes the difference between the low-resolution difference data and the average value of the high-resolution difference data for each pixel block is performed, it is possible to upsample the difference data without using a filter.

7. Seventh Embodiment

In the fifth embodiment, although distance data is upsampled, charge signals may be upsampled. The mobile terminal 100 of the seventh embodiment is different from that of the fifth embodiment in that the mobile terminal 100 upsamples the charge signals.

Figure 28:
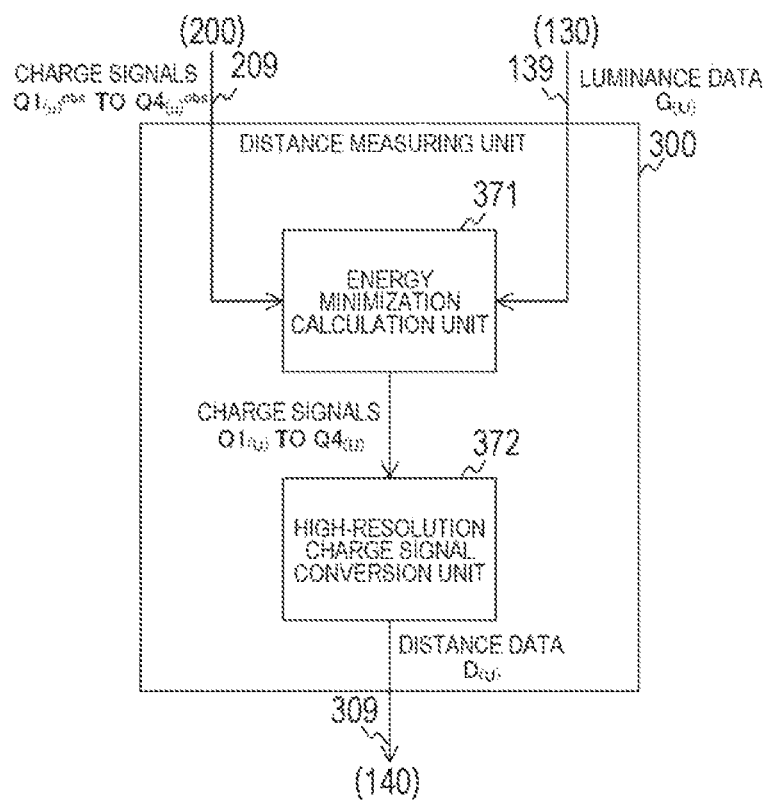
FIG. 28 is a block diagram illustrating a configuration example of a distance measuring unit according to a seventh embodiment of the present technology.

FIG. 28 is a block diagram illustrating a configuration example of the distance measuring unit 300 according to the seventh embodiment of the present technology. The distance measuring unit 300 of the seventh embodiment includes an energy minimization calculation unit 371 and a high-resolution charge signal conversion unit 372.

The energy minimization calculation unit 371 generates high-resolution charge signals by energy minimization calculation that minimizes the difference between the low-resolution charge signal and the average value of the high-resolution charge signals for each pixel block. First, restriction conditions by the following equation are defined on the basis of the principle of the ToF scheme.

[Math. 30]

$$Q1'_{(U)} + Q2'_{(U)} = Q3'_{(U)} + Q4'_{(U)} \text{ for } \forall U \in H \quad \text{Equation 32}$$

The energy minimization calculation unit 371 calculates high-resolution charge signals $Q1_{(U)}$ to $Q4_{(U)}$ that satisfy the following equations under the restriction conditions of Equation 32.

[Math. 31]

$$\{Qi_{(U)} \mid i = 1, 2, 3, 4. \ U \in H\} = \quad \text{Equation 33}$$
$$\operatorname*{argmin}_{\{Qi_{(U)}|i=1,2,3,4. \ U\in H\}} (dTerm + A \times sTerm)$$

[Math. 32]

$$dTerm \equiv \sum_{i=1,2,3,4} \sum_{u \in L} \left\{ \left( \frac{\sum_{V \in \Omega u \cap H} Qi'_{(V)}}{N} - Qi^{obs}_{(u)} \right)^2 \right\} \quad \text{Equation 34}$$

[Math. 33]

$$sTerm \equiv \sum_{i=1,2,3,4} \sum_{U \in H} \left\{ \left\| T^{\frac{1}{2}}_{(U)} \nabla Qi'_{(U)} \right\| \right\} \quad \text{Equation 35}$$

[Math. 34]

$$T^{\frac{1}{2}}_{(U)} \equiv \exp(-B \|\nabla G_{(U)}\|^r) n_{(U)} n_{(U)}^t + m_{(U)} m_{(U)}^t \quad \text{Equation 36}$$

Moreover, the pixel position U is represented by Equations 24 and 25 and the following equation.

[Math. 35]

$$D'_{(U)} \equiv \frac{c}{4\pi f} \cdot \arctan\left( \frac{Q3'_{(U)} - Q4'_{(U)}}{Q1'_{(U)} - Q2'_{(U)}} \right) \quad \text{Equation 37}$$

By Equations 33 to 36, the high-resolution charge signal $Qi_{(U)}$ that minimizes the difference between the low-resolution charge signal $Qi_{(U)}^{obs}$ and the average value of the high-resolution charge signals $Qi_{(U)}$ in the corresponding pixel block is calculated.

The high-resolution charge signal conversion unit 372 calculates the high-resolution distance data $D_{(U)}$ using the following equation and supplies the same to the distance data processing unit 140.

[Math. 36]

$$D_{(U)} = \frac{c}{4\pi f} \cdot \arctan\left( \frac{Q3_{(U)} - Q4_{(U)}}{Q1_{(U)} - Q2_{(U)}} \right) \quad \text{Equation 38}$$

Figure 29:
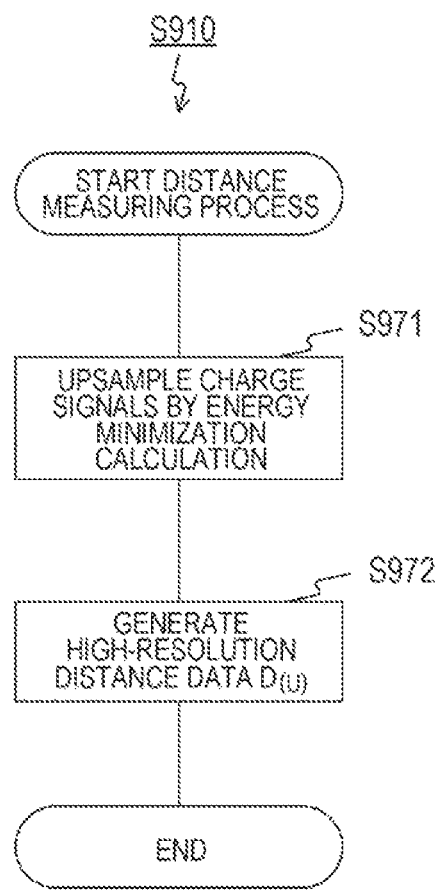
FIG. 29 is a flowchart illustrating an example of a distance measuring process according to the seventh embodiment of the present technology.

FIG. 29 is a flowchart illustrating an example of a distance measuring process according to the seventh embodiment of the present technology. The distance measuring unit 300 upsamples the low-resolution charge signal $Qi_{(u)}^{obs}$ by energy minimization calculation (step S971) and generates high-resolution distance data $D_{(U)}$ from the upsampled charge signal $Qi_{(U)}$ (step S972). After step S972 ends, the distance measuring unit 300 ends the distance measuring process.

Incidentally, the definition of the luminance data G will be described further. G( ) of which the argument is represented by V or P (that is, G(V) or G(P) used in the first to fourth embodiments) indicates the luminance data of the pixel position V or P on the solid-state imaging element 130. On the other hand, G( ) of which the argument is represented by U (that is, G(U) used in the fifth to seventh embodiments) indicates the luminance data of the pixel position on the solid-state imaging element 130 illustrated in Equation 24 corresponding to a position $U=(Ux,Uy)^t$ on the ToF sensor 200. Here, a 2-dimensional position represented by Equation 24 corresponding to $U=(Ux,Uy)^t$ is derived using Equation 25.

As described above, in the seventh embodiment of the present technology, since energy minimization calculation that minimizes the difference between the low-resolution charge signal and the average value of the high-resolution charge signals for each pixel block is performed, it is possible to upsample charge signals without using a filter.

8. Application Example to Movable Body

The technology (present technology) related to the present disclosure can be applied to various products. For example, the technology related to the present disclosure may be realized as a device mounted on a movable body of any one of the types such as an automobile, an electric vehicle, a hybrid electric automobile, a motorcycle, a bicycle, a personal mobility, an aircraft, a drone, a ship, or a robot.

Figure 30:
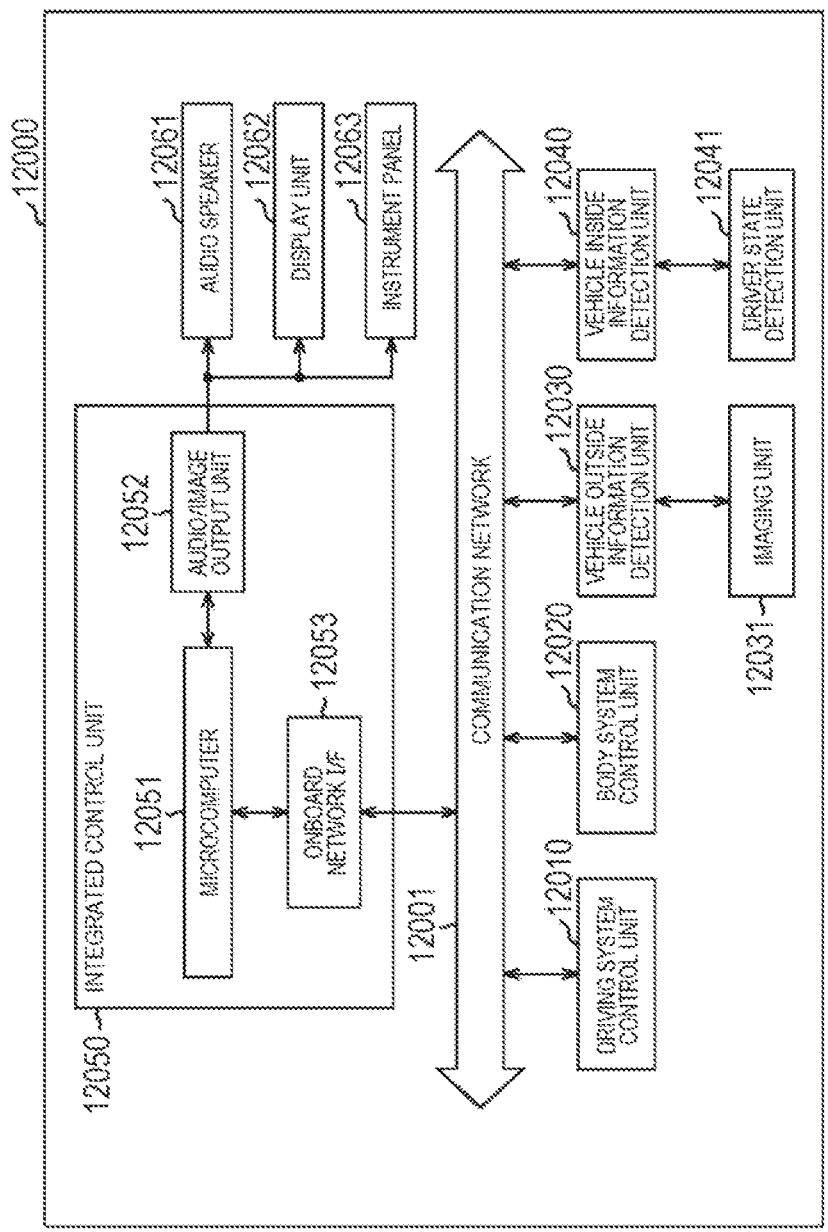
FIG. 30 is a block diagram illustrating an example of a schematic configuration of a vehicle control system.

FIG. 30 is a block diagram illustrating a schematic configuration example of a vehicle control system which is an example of a movable body control system to which the technology related to the present disclosure is applied.

A vehicle control system 12000 includes a plurality of electronic control units connected via a communication network 12001. In the example illustrated in FIG. 30, the vehicle control system 12000 includes a driving system control unit 12010, a body system control unit 12020, a vehicle outside information detection unit 12030, a vehicle-inside information detection unit 12040, and an integrated control unit 12050. Moreover, a microcomputer 12051, an audio/image output unit 12052, and an onboard network interface (I/F) 12053 are illustrated as functional configurations of the integrated control unit 12050.

The driving system control unit 12010 controls the operations of devices related to the vehicle driving system according to various programs. For example, the driving system control unit 12010 functions as a control device such as a driving force generation device for generating driving force of a vehicle such as an internal combustion engine or a driving motor, a driving force transmission mechanism for transmitting the driving force to wheels, a steering mechanism that adjusts the steering angle of the vehicle, and a braking device that generates the braking force of the vehicle.

The body system control unit 12020 controls the operations of various devices equipped in the vehicle body according to various programs. For example, the body system control unit 12020 functions as a control device for a keyless entry system, a smart key system, a power window device, or various lights such as a headlight, a backup light, a brake light, a blinker, or a fog lamp. In this case, the body system control unit 12020 can receive radio waves transmitted from a portable device that serves as a key or signals of various switches. The body system control unit 12020 receives these radio waves or signals and controls the door lock device, the power window device, the lights, and the like of the vehicle.

The vehicle outside information detection unit 12030 detects information on the outside of the vehicle having the vehicle control system 12000 mounted thereon. For example, the vehicle outside information detection unit 12030 is connected to an imaging unit 12031. The vehicle outside information detection unit 12030 causes the imaging unit 12031 to capture the images of the vehicle outside and receives the captured images. The vehicle outside information detection unit 12030 may perform a process of detecting an object such as a person, a vehicle, an obstacle, a traffic sign, or characters on a road surface or a distance detection process on the basis of the received images.

The imaging unit 12031 is an optical sensor that receives light and outputs electrical signals corresponding to the amount of received light. The imaging unit 12031 can output the electrical signals as images and output the same as distance measurement information. Moreover, the light that the imaging unit 12031 receives may be visible light and may be invisible light such as infrared light.

The vehicle inside information detection unit 12040 detects information on the inside of the vehicle. The vehicle inside information detection unit 12040 is connected to a driver state detection unit 12041 that detects the state of a driver, for example. The driver state detection unit 12041 may include a camera that images the driver, for example. The vehicle inside information detection unit 12040 may calculate the degree of the driver's tiredness or the degree of the driver's concentration or determine whether the driver is dozing on the basis of the detection information input from the driver state detection unit 12041.

The microcomputer 12051 can calculate a control target value of a driving force generation device, a steering mechanism, or a braking device on the basis of the vehicle outside/inside information acquired by the vehicle outside information detection unit 12030 or the vehicle inside information detection unit 12040 and output control commands to the driving system control unit 12010. For example, the microcomputer 12051 can perform cooperative control aiming to realize the function of advanced driver assistance system (ADAS) including vehicle collision avoidance or impact reduction, follow-up driving based on the inter-vehicle distance, constant vehicle speed driving, vehicle collision warning, vehicle lane departure warning, or the like.

Moreover, the microcomputer 12051 can perform cooperative control aiming to realize automatic driving or the like that allows a vehicle to travel autonomously regardless of operations of a driver by controlling the driving force generation device, the steering mechanism, the braking device, or the like on the basis of the information on the surrounding of the vehicle acquired by the vehicle outside information detection unit 12030 or the vehicle inside information detection unit 12040.

Moreover, the microcomputer 12051 can output control commands to the body system control unit 12020 on the basis of the vehicle outside information acquired by the vehicle outside information detection unit 12030. For example, the microcomputer 12051 can perform cooperative control aiming to realize glare protection in such a manner as to control headlights according to the position of a preceding vehicle or an oncoming vehicle detected by the vehicle outside information detection unit 12030 to switch a high beam to a low beam, for example.

The audio/image output unit 12052 transmits an output signal of at least one of audio or image to an output device capable of notifying a passenger of a vehicle or the vehicle outside of information visually or audibly. In the example of FIG. 30, an audio speaker 12061, a display unit 12062, and an instrument panel 12063 are illustrated as the output device. The display unit 12062 may include at least one of an onboard display and a head-up display, for example.

Figure 31:
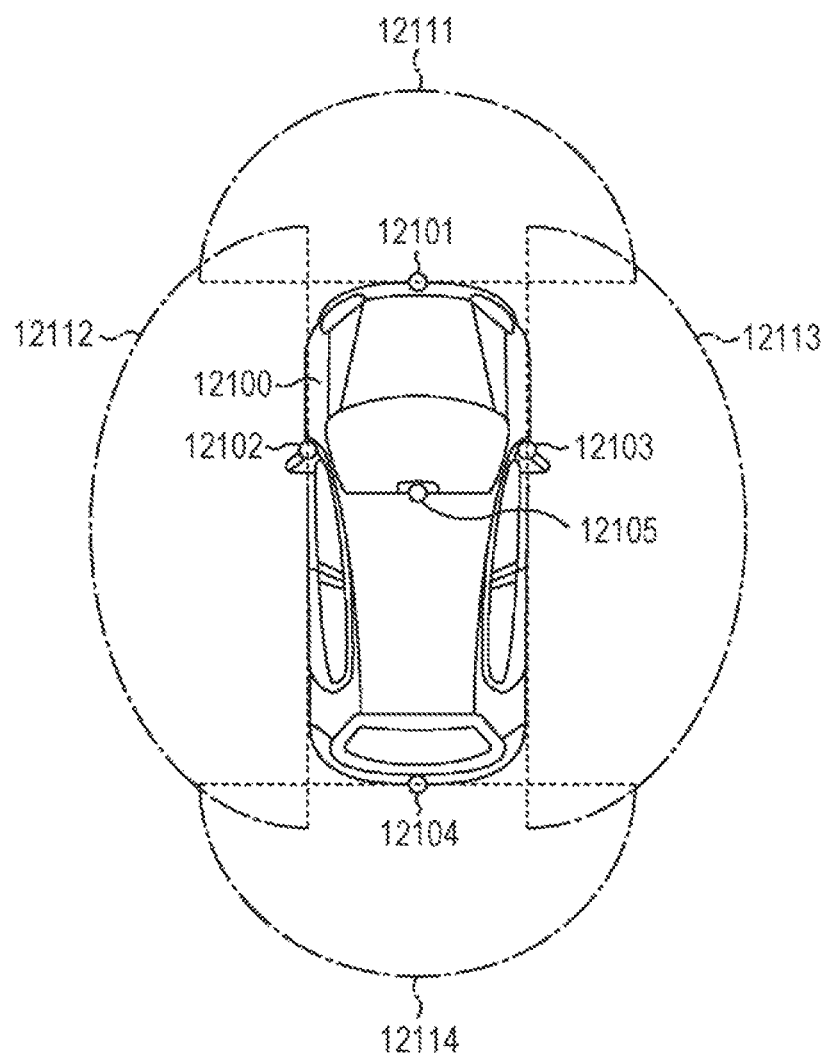
FIG. 31 is an explanatory diagram illustrating an example of the installed positions of a vehicle outside information detection unit and an imaging unit.

FIG. 31 is a diagram illustrating an example of an installed position of the imaging unit 12031.

In FIG. 31, the imaging unit 12031 includes imaging units 12101, 12102, 12103, 12104, and 12105.

The imaging units 12101, 12102, 12103, 12104, and 12105 are positioned, for example, at positions such as the front nose, the side mirrors, the rear bumper, the back door, and the upper part of the windshield in the vehicle compartment of a vehicle 12100. The imaging unit 12101 provided on the front nose and the imaging unit 12105 provided on the upper part of the windshield in the vehicle compartment mainly acquire images of the area ahead the vehicle 12100. The imaging units 12102 and 12103 provided on the side mirrors mainly acquire images of the areas on the sides of the vehicle 12100. The imaging unit 12104 provided on the rear bumper or the back door mainly acquires images of the area behind the vehicle 12100. The imaging unit 12105 provided on the upper part of the windshield in the vehicle compartment is mainly used for detecting a preceding vehicle, a pedestrian, an obstacle, a traffic light, a traffic sign, a lane, or the like.

Incidentally, FIG. 31 illustrates an example of the imaging ranges of the imaging units 12101 to 12104. An imaging range 12111 indicates the imaging range of the imaging unit 12101 provided on the front nose, imaging ranges 12112 and 12113 indicate the imaging ranges of the imaging units 12102 and 12103 provided on the side mirrors, an imaging range 12114 indicates the imaging range of the imaging unit 12104 provided on the rear bumper or the back door. For example, when the pieces of image data captured by the imaging units 12101 to 12104 are superimposed on each other, an overhead image when the vehicle 12100 is seen from the above is obtained.

At least one of the imaging units 12101 to 12104 may have a distance information acquisition function. For example, at least one of the imaging units 12101 to 12104 may be a stereo camera made up of a plurality of imaging elements and may be an imaging element having phase difference detection pixels.

For example, the microcomputer 12051 can extract a solid object located closest to a traveling path of the vehicle 12100 and traveling at a predetermined speed (for example, 0 km/h or higher) in approximately the same direction as the vehicle 12100 as a preceding vehicle by calculating a distance to each solid object in the imaging ranges 12111 to 12114 and a change over time in the distance (a speed relative to the vehicle 12100) on the basis of the distance information obtained from the imaging units 12101 to 12104. Moreover, the microcomputer 12051 can set an inter-vehicle distance that is to be secured in advance ahead of the preceding vehicle and perform automatic brake control (including follow-up stop control), automatic acceleration control (including follow-up start control), and the like. In this manner, it is possible to perform cooperative control aiming to realize automatic driving for allowing a vehicle to travel autonomously regardless of an operation of a driver, for example.

For example, the microcomputer 12051 can classify solid object data related to solid objects into two-wheel vehicles, normal vehicles, large-size vehicles, pedestrians, telegraph posts, and other solid objects and extracts solid objects on the basis of the distance information obtained from the imaging units 12101 to 12104 and use the classified and extracted data in avoiding obstacles automatically. For example, the microcomputer 12051 identifies obstacles around the vehicle 12100 as obstacles that the driver of the vehicle 12100 can visually recognize and obstacles that the driver cannot easily recognize. Further, the microcomputer 12051 can perform driving assistance for collision avoidance by determining a collision risk indicating the degree of risk of collision with each obstacle and outputting a warning to the driver via the audio speaker 12061 or the display unit 12062 and performing forced deceleration and avoidance steering via the driving system control unit 12010 when the collision risk is equal to or larger than a set value and there is a possibility of collision.

At least one of the imaging units 12101 to 12104 may be an infrared camera that detects infrared light. For example, the microcomputer 12051 can recognize a pedestrian by determining whether or not a pedestrian is present in the images captured by the imaging units 12101 to 12104. The pedestrian is recognized by a procedure of extracting feature points in the images captured by the imaging units 12101 to 12104 as infrared cameras, for example, and a procedure of performing a pattern matching process on a series of feature points indicating the contour of an object and determining whether or not the contour indicates a pedestrian. When the microcomputer 12051 determines that a pedestrian is present in the images captured by the imaging units 12101 to 12104 and recognizes the pedestrian, the audio/image output unit 12052 controls the display unit 12062 to display a rectangular contour line for emphasizing the recognized pedestrian so as to be superimposed on the image. Moreover, the audio/image output unit 12052 may control the display unit 12062 so that an icon or the like indicating the pedestrian is displayed at a desired position.

Hereinabove, an example of the vehicle control system to which the technology related to the present disclosure is applied has been described. The technology related to the present disclosure may be applied to the microcomputer 12051 and the imaging units 12101 to 12104 among the above-described configurations. Specifically, any one of the imaging units 12101 to 12104 generates charge signals, the remaining imaging units generate luminance data, and the microcomputer 12051 generate a depth map. Since the distance measurement accuracy can be improved by applying the technology related to the present disclosure to the microcomputer 12051 and the imaging units 12101 to 12104, it is possible to detect an obstacle or the like accurately and improve the safety of vehicles.

Incidentally, it should be noted that the embodiments described above are examples for embodying the present technology, and matters in the embodiments and matters specifying the invention in the claims have respective correspondence relationships. Similarly, the matters specifying the invention in the claims and matters in the embodiments of the present technology, which are denoted by names identical to the matters specifying the invention, have respective correspondence relationships. It should be noted that the present technology is not limited to the embodiments and can be embodied by variously modifying the embodiments without departing from the gist of the present technology.

Further, the processing procedures described in the above embodiments may be understood as a method including a series of those procedures. Alternatively, the processing procedures may be understood as a program for causing a computer to execute the series of procedures or as a recording medium storing that program. As the recording medium, for example, a Compact Disc (CD), a MiniDisc (MD), a Digital Versatile Disc (DVD), a memory card, a Blu-ray (registered trademark) Disc, or the like may be used.

Incidentally, the effects described in the present specification are examples only and are not limited thereto, but may include other effects.

Incidentally, it should be noted that the present technology can have the following configurations.

(1) A distance measuring device including:
a continuous light reception unit having a predetermined number of pixel blocks in which a plurality of continuous light pixels that generate continuous light reception data indicating amounts of received continuous light is arranged;
an intermittent light reception unit in which an intermittent light pixel that generates intermittent light reception data indicating an amount of received intermittent light is provided in correlation with each of the predetermined number of pixel blocks; and a distance measuring unit that generates distance data for each of the plurality of continuous light pixels using an average value of the continuous light reception data for each of the pixel blocks, the continuous light reception data, and the intermittent light reception data as high-resolution distance data.

(2) The distance measuring device according to (1), in which
the distance measuring unit includes:
a predetermined filter; and
an average calculation unit that calculates the average value for each of the pixel blocks and inputs the average value to the predetermined filter.

(3) The distance measuring device according to (2), in which the predetermined filter is a cross bilateral filter.

(4) The distance measuring device according to (2) or (3), in which the distance measuring unit further includes:
a low-resolution distance data generation unit that generates distance data for each of the intermittent light pixels on the basis of the intermittent light reception data as low-resolution distance data and inputs the low-resolution distance data to the predetermined filter, and the predetermined filter generates the high-resolution distance data on the basis of the low-resolution distance data, the average value, and the continuous light reception data.

(5) The distance measuring device according to (2) or (3), in which the intermittent light reception data includes first, second, third, and fourth low-resolution charge signals, and the distance measuring unit further includes:

a difference data generation unit that generates difference data between the first and second low-resolution charge signals and difference data between the third and fourth low-resolution charge signals for each of the intermittent light pixels as low-resolution difference data and inputs the low-resolution difference data to the predetermined filter; and a high-resolution difference data conversion unit that converts high-resolution difference data to the high-resolution distance data for each of the continuous light pixels, and the predetermined filter generates the high-resolution difference data on the basis of the low-resolution difference data, the average value, and the continuous light reception data.

(6) The distance measuring device according to (1), in which the distance measuring unit includes:

an average calculation unit that calculates the average value for each of the pixel blocks; and a regression analysis unit that calculates a predetermined function from the average value by regression analysis.

(7) The distance measuring device according to claim 6, in which the distance measuring unit further includes:

a low-resolution distance data generation unit that generates distance data for each of the intermittent light pixels on the basis of the intermittent light reception data as low-resolution distance data and inputs the low-resolution distance data to the regression analysis unit; and a high-resolution distance data generation unit that inputs the continuous light reception data to the predetermined function to generate the high-resolution distance data, and the regression analysis unit calculates a function indicating a relation between the low-resolution distance data and the average value as the predetermined function.

(8) The distance measuring device according to (6), in which the intermittent light reception data includes first, second, third, and fourth low-resolution charge signals, the distance measuring unit further includes:

a difference data generation unit that generates difference data between the first and second low-resolution charge signals and difference data between the third and fourth low-resolution charge signals for each of the intermittent light pixels as low-resolution difference data and inputs the low-resolution difference data to the regression analysis unit;

a high-resolution distance data generation unit that inputs the continuous light reception data to the predetermined function to generate high-resolution difference data for each of the continuous light pixels; and a high-resolution difference data conversion unit that converts the high-resolution difference data to the high-resolution distance data for each of the continuous light pixels, and the regression analysis unit calculates a function indicating a relation between the low-resolution difference data and the average value as the predetermined function.

(9) A distance measuring device including:

a continuous light reception unit having a predetermined number of pixel blocks in which a plurality of continuous light pixels that generate continuous light reception data indicating amounts of received continuous light is arranged;

an intermittent light reception unit in which an intermittent light pixel that generates intermittent light reception data indicating an amount of received intermittent light is provided in correlation with each of the predetermined number of pixel blocks; and a distance measuring unit that generates distance data for each of the plurality of continuous light pixels on the basis of the intermittent light reception data and the continuous light reception data by energy minimization calculation as high-resolution distance data.

(10) The distance measuring device according to (9), in which the distance measuring unit includes:

a low-resolution distance data generation unit that generates distance data for each of the intermittent light pixels on the basis of the intermittent light reception data as low-resolution distance data; and an energy minimization calculation unit that generates the high-resolution distance data by the energy minimization calculation that minimizes a difference between the low-resolution distance data and an average value of the high-resolution distance data for each of the pixel blocks.

(11) The distance measuring device according to (9), in which the intermittent light reception data includes first, second, third, and fourth low-resolution charge signals, and the distance measuring unit further includes:

a difference data generation unit that generates difference data between the first and second low-resolution charge signals and difference data between the third and fourth low-resolution charge signals for each of the intermittent light pixels as low-resolution difference data;

an energy minimization calculation unit that generates high-resolution difference data by the energy minimization calculation that minimizes a difference between the low-resolution difference data and an average value of the high-resolution difference data for each of the pixel blocks; and a high-resolution difference data conversion unit that converts the high-resolution difference data to the high-resolution distance data for each of the continuous light pixels.

(12) The distance measuring device according to (9), in which the intermittent light reception data includes first, second, third, and fourth low-resolution charge signals, and the distance unit includes:

an energy minimization calculation unit that generates first, second, third, and fourth high-resolution charge signals by the energy minimization calculation that minimizes a difference between an average value of the first, second, third, and fourth high-resolution charge signals and the first, second, third, and fourth low-resolution charge signals for each of the pixel blocks; and a high-resolution charge signal conversion unit that converts the first, second, third, and fourth high-resolution charge signals to the high-resolution distance data.

(13) A distance measuring device control method including:

a continuous light reception procedure of allowing a continuous light reception unit having a predetermined number of pixel blocks in which a plurality of continuous light pixels is arranged to generate continuous light reception data indicating amounts of received continuous light by the plurality of continuous light pixels;

an intermittent light reception procedure of allowing an intermittent light reception unit in which an intermittent light pixel is provided in correlation with each of the predetermined number of pixel blocks to generate intermittent light reception data indicating an amount of received intermittent light by the intermittent light pixel; and a distance measuring procedure of generating distance data for each of the plurality of continuous light pixels using an average value of the continuous light reception data for each of the pixel blocks, the continuous light reception data, and the intermittent light reception data as high-resolution distance data.

(14) A distance measuring device control method including:

a continuous light reception procedure of allowing a continuous light reception unit having a predetermined number of pixel blocks in which a plurality of continuous light pixels is arranged to generate continuous light reception data indicating amounts of received continuous light by the plurality of continuous light pixels;

an intermittent light reception procedure of allowing an intermittent light reception unit in which an intermittent light pixel is provided in correlation with each of the predetermined number of pixel blocks to generate intermittent light reception data indicating an amount of received intermittent light by the intermittent light pixel; and a distance measuring procedure of generating distance data for each of the plurality of continuous light pixels on the basis of the intermittent light reception data and the continuous light reception data by energy minimization calculation as high-resolution distance data.

REFERENCE SIGNS LIST

100 Mobile terminal
110 Light emission unit
120 Control unit
130 Solid-state imaging element
131, 210 Row scanning circuit
132, 220 Pixel array unit
133 Pixel block
134, 230 Pixel circuit
135, 240 Timing control unit
136, 250 AD conversion unit
137, 260 Column scanning circuit
138, 270 Signal processing unit
140 Distance data processing unit
200 ToF sensor
231 Light reception element
232 Transfer switch
233, 234 Charge accumulation unit
235, 236 Selection switch
300 Distance measuring unit
311 Low-resolution distance data generation unit
312 Projection position supply unit
313 Average calculation unit
314 Cross bilateral filter
315, 316 Function calculation unit
317 Distance data upsampling unit
323 Difference data upsampling unit
324 High-resolution difference data conversion unit
331, 341 Regression analysis unit
332 High-resolution distance data generation unit
342 High-resolution difference data generation unit
351, 362, 371 Energy minimization calculation unit
361 Low-resolution difference data generation unit
372 High-resolution charge signal conversion unit
12101, 12102, 12103, 12104, 12105 Imaging unit
12051 Microcomputer

The invention claimed is:
1. A distance measuring device, comprising:
a continuous light reception unit having a predetermined number of pixel blocks in which a plurality of continuous light pixels that generate continuous light reception data indicating amounts of received continuous light is arranged;
an intermittent light reception unit in which an intermittent light pixel that generates intermittent light reception data indicating an amount of received intermittent light is provided in correlation with each of the predetermined number of pixel blocks; and
a distance measuring unit that generates distance data for each of the plurality of continuous light pixels using an average value of the continuous light reception data for each of the predetermined number of pixel blocks, the continuous light reception data, and the intermittent light reception data as high-resolution distance data.
2. The distance measuring device according to claim 1, wherein
the distance measuring unit includes:
a predetermined filter; and
an average calculation unit that calculates the average value for each of the pixel blocks and inputs the average value to the predetermined filter.
3. The distance measuring device according to claim 2, wherein
the predetermined filter is a cross bilateral filter.
4. The distance measuring device according to claim 2, wherein
the distance measuring unit further includes a low-resolution distance data generation unit that generates distance data for each of the intermittent light pixels based on the intermittent light reception data as low-resolution distance data and inputs the low-resolution distance data to the predetermined filter, and
the predetermined filter generates the high-resolution distance data based on the low-resolution distance data, the average value, and the continuous light reception data.
5. The distance measuring device according to claim 2, wherein
the intermittent light reception data includes first, second, third, and fourth low-resolution charge signals, and
the distance measuring unit further includes:
a difference data generation unit that generates difference data between the first and second low-resolution charge signals and difference data between the third and fourth low-resolution charge signals for each of the intermittent light pixels as low-resolution difference data and inputs the low-resolution difference data to the predetermined filter; and
a high-resolution difference data conversion unit that converts high-resolution difference data to the high-resolution distance data for each of the plurality of continuous light pixels, and
the predetermined filter generates the high-resolution difference data based on the low-resolution difference data, the average value, and the continuous light reception data.

6. The distance measuring device according to claim 1, wherein
the distance measuring unit includes:
an average calculation unit that calculates the average value for each of the pixel blocks; and
a regression analysis unit that calculates a predetermined function from the average value by regression analysis.

7. The distance measuring device according to claim 6, wherein
the distance measuring unit further includes:
a low-resolution distance data generation unit that generates distance data for each of the intermittent light pixels based on the intermittent light reception data as low-resolution distance data and inputs the low-resolution distance data to the regression analysis unit; and
a high-resolution distance data generation unit that inputs the continuous light reception data to the predetermined function to generate the high-resolution distance data, and the regression analysis unit calculates a function indicating a relation between the low-resolution distance data and the average value as the predetermined function.

8. The distance measuring device according to claim 6, wherein
the intermittent light reception data includes first, second, third, and fourth low-resolution charge signals,
the distance measuring unit further includes:
a difference data generation unit that generates difference data between the first and second low-resolution charge signals and difference data between the third and fourth low-resolution charge signals for each of the intermittent light pixels as low-resolution difference data and inputs the low-resolution difference data to the regression analysis unit;
a high-resolution distance data generation unit that inputs the continuous light reception data to the predetermined function to generate high-resolution difference data for each of the plurality of continuous light pixels; and
a high-resolution distance data conversion unit that converts the high-resolution difference data to the high-resolution distance data for each of the plurality of continuous light pixels, and
the regression analysis unit calculates a function indicating a relation between the low-resolution difference data and the average value as the predetermined function.

9. A distance measuring device control method, comprising:
allowing a continuous light reception unit having a predetermined number of pixel blocks in which a plurality of continuous light pixels is arranged to generate continuous light reception data indicating amounts of received continuous light by the plurality of continuous light pixels;
allowing an intermittent light reception unit in which an intermittent light pixel is provided in correlation with each of the predetermined number of pixel blocks to generate intermittent light reception data indicating an amount of received intermittent light by the intermittent light pixel; and
generating distance data for each of the plurality of continuous light pixels using an average value of the continuous light reception data for each of the predetermined number of pixel blocks, the continuous light reception data, and the intermittent light reception data as high-resolution distance data.

* * * * *